US011513607B2

(12) United States Patent
Krichenbauer

(10) Patent No.: US 11,513,607 B2
(45) Date of Patent: Nov. 29, 2022

(54) PATH RECOGNITION METHOD USING A COMBINATION OF INVARIANT POSITIONAL DATA AND ATTRIBUTES OF VARIATION, PATH RECOGNITION DEVICE, PATH RECOGNITION PROGRAM, AND PATH RECOGNITION PROGRAM RECORDING MEDIUM

(71) Applicant: MARUI-PLUGIN CO., LTD., Osaka (JP)

(72) Inventor: Maximilian Michael Krichenbauer, Osaka (JP)

(73) Assignee: MARUI-PlugIn Co., Ltd., Osaka (JP)

(\*) Notice: Subject to any disclaimer, the term of this patent is extended or adjusted under 35 U.S.C. 154(b) by 0 days.

(21) Appl. No.: 17/286,403

(22) PCT Filed: Nov. 1, 2020

(86) PCT No.: PCT/JP2020/000774
§ 371 (c)(1),
(2) Date: Apr. 16, 2021

(87) PCT Pub. No.: WO2020/195017
PCT Pub. Date: Oct. 1, 2020

(65) Prior Publication Data
US 2022/0004263 A1    Jan. 6, 2022

(30) Foreign Application Priority Data
Mar. 27, 2019   (JP) .............................. JP2019-059644

(51) Int. Cl.
*G06F 3/01* (2006.01)
*G06F 3/04815* (2022.01)

(52) U.S. Cl.
CPC .......... *G06F 3/017* (2013.01); *G06F 3/04815* (2013.01)

(58) Field of Classification Search
CPC ..... G06F 3/017; G06F 3/04815; G06V 40/28; G06V 10/764
See application file for complete search history.

(56) References Cited

U.S. PATENT DOCUMENTS

2006/0085767 A1    4/2006  Hinckley et al.
2010/0027845 A1*   2/2010  Kim ...................... G06V 40/28
                                                    382/107

(Continued)

FOREIGN PATENT DOCUMENTS

JP    1998255052 A    12/1998
JP    2012-123608 A    6/2012

(Continued)

OTHER PUBLICATIONS

International Search Report PCT/JP2020/000774—English Translation—dated Mar. 17, 2020.

*Primary Examiner* — Richard J Hong
(74) *Attorney, Agent, or Firm* — Diament Patent Law, P.C.; Adam Diament

(57) ABSTRACT

The shape or movement of a gesturing body or portion thereof in two- or three-dimensional space is ascertained from the path of the outline of the shape or the path of the movement. The method disclosed involves receiving input of data that represents a path and using artificial intelligence to recognize the meaning of the path, i.e., to recognize which of a plurality of pre-prepared meanings is the meaning of a gesture. As pre-processing for inputting location data for a point group along the path to the artificial intelligence, at least one attribute from among the location, size, and direction of the entire point group is extracted, and location data for the point group is converted to attribute invariant location data that is relative to the extracted attribute(s) but not dependent on the extracted attribute(s). Then data that includes the attribute invariant location data and the (Continued)

extracted attribute(s) is inputted to the artificial intelligence as input data. The result is efficient and effective processing of gesture-based dialogue between a user and a computer.

19 Claims, 17 Drawing Sheets

(56) References Cited

U.S. PATENT DOCUMENTS

| | | |
|---|---|---|
| 2010/0149090 A1 | 6/2010 | Morris et al. |
| 2011/0110560 A1* | 5/2011 | Adhikari ............. G06V 10/764 |
| | | 382/103 |
| 2012/0163723 A1* | 6/2012 | Balan .................... G06F 3/017 |
| | | 382/224 |
| 2014/0347263 A1 | 11/2014 | Dai et al. |
| 2016/0171340 A1* | 6/2016 | Fleishman ............. G06V 40/28 |
| | | 382/159 |
| 2017/0161555 A1 | 6/2017 | Kumar et al. |

FOREIGN PATENT DOCUMENTS

| | | |
|---|---|---|
| JP | 2012-175282 A | 9/2012 |
| JP | 2017-084370 A | 5/2017 |
| JP | 2017-537370 A | 12/2017 |
| JP | 2018010348 A | 1/2018 |

\* cited by examiner

Fig.1I
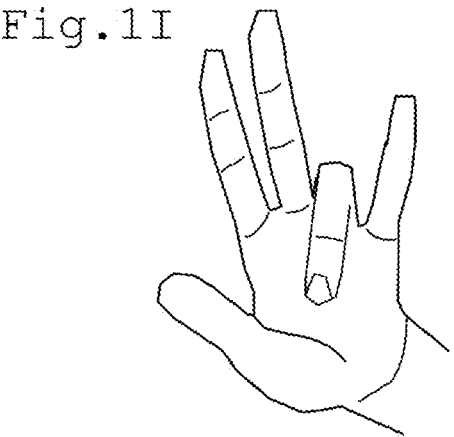 
Fig.1J
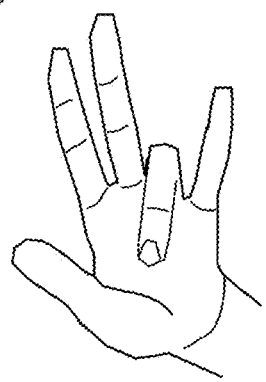  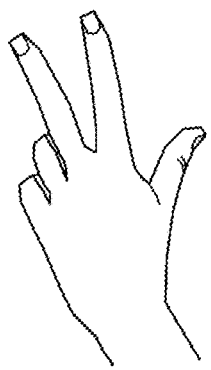
 
Path 1            Path 2

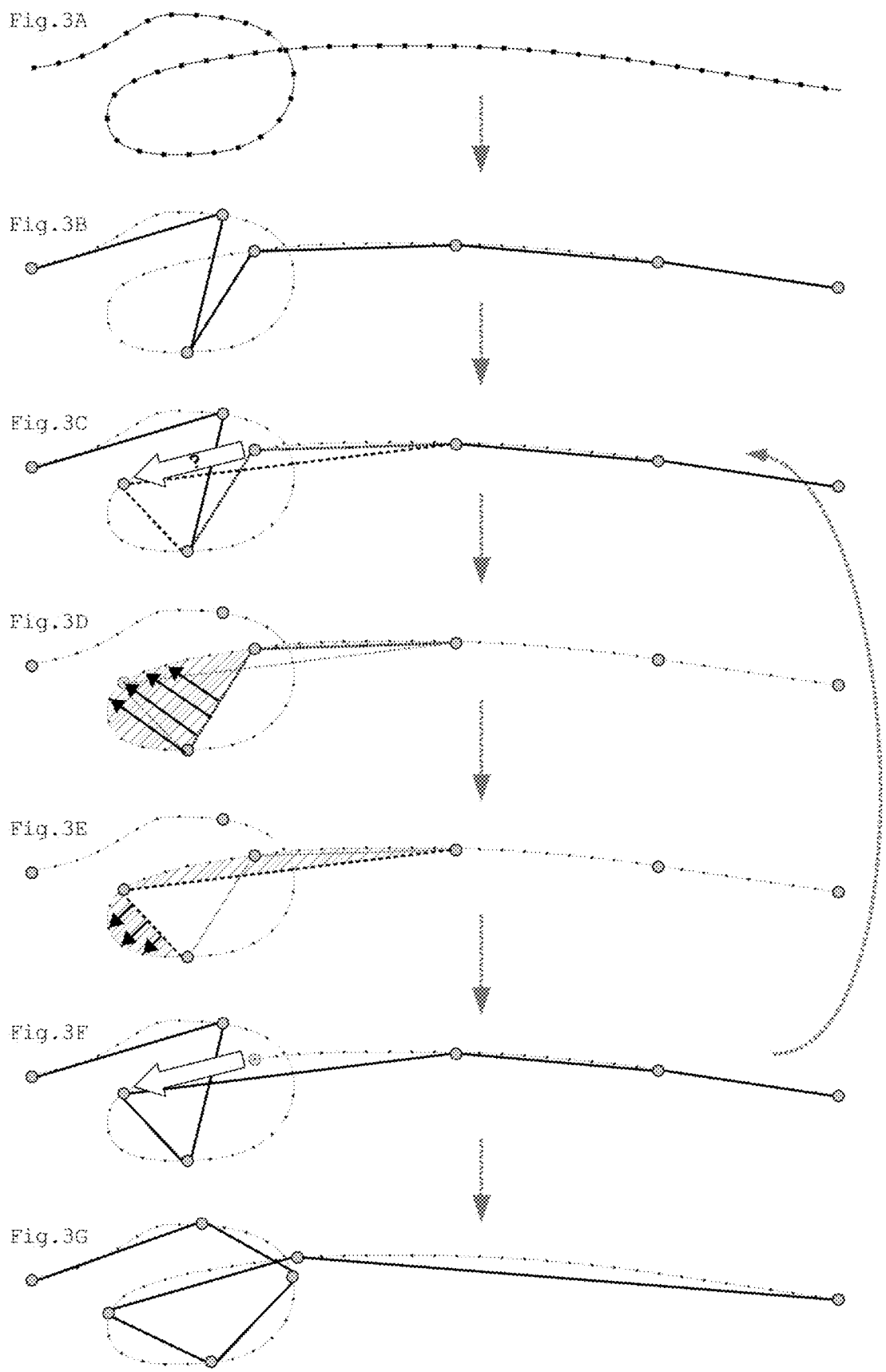

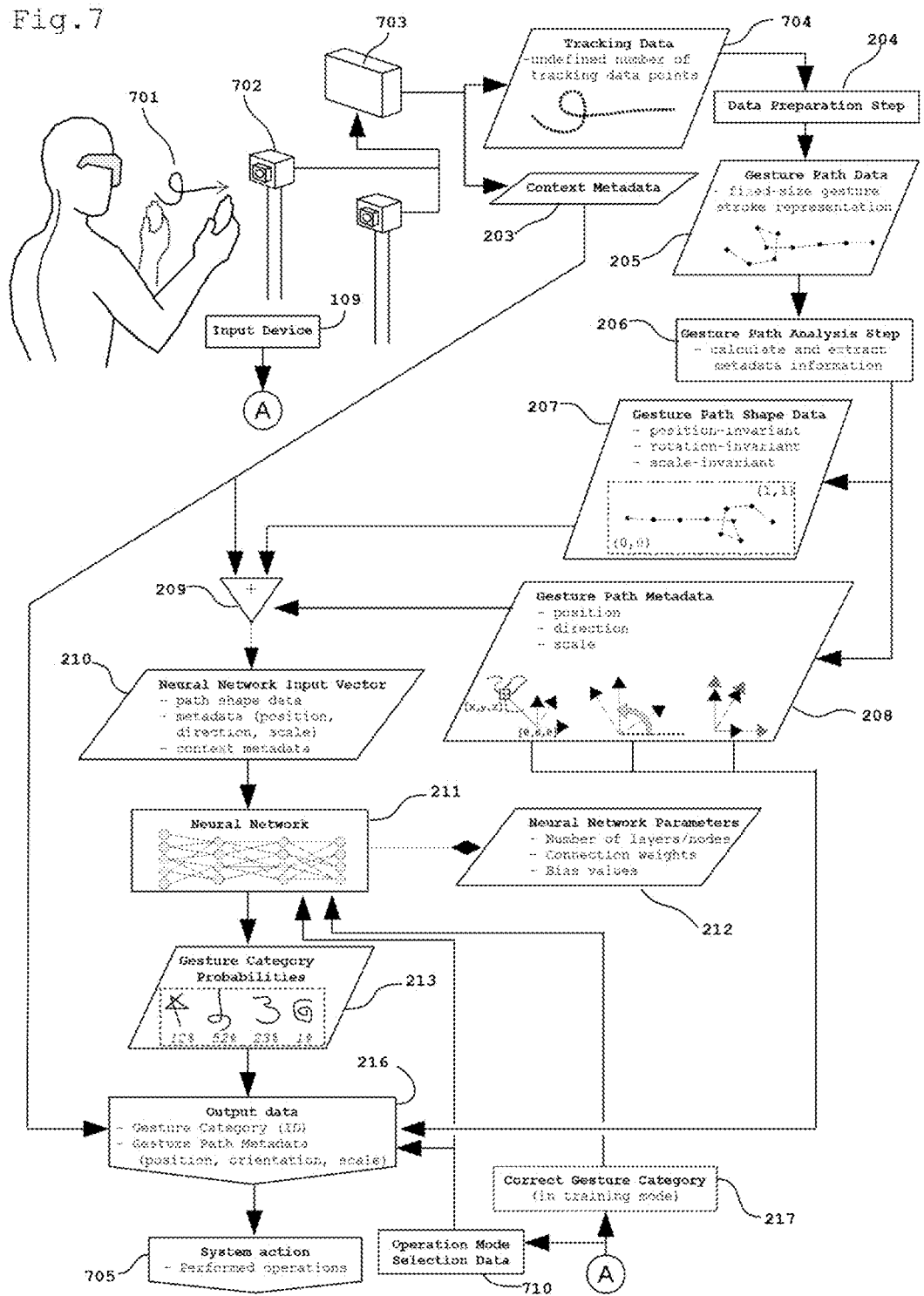

PATH RECOGNITION METHOD USING A COMBINATION OF INVARIANT POSITIONAL DATA AND ATTRIBUTES OF VARIATION, PATH RECOGNITION DEVICE, PATH RECOGNITION PROGRAM, AND PATH RECOGNITION PROGRAM RECORDING MEDIUM

CROSS-REFERENCE

This application is the U.S. National Stage of International Application No. PCT/JP2020/000774 filed on Jan. 11, 2020, which claims the benefit of priority from Japanese Patent application No. JP2019-059644 filed Mar. 27, 2019, the contents of which are both herein incorporated by reference in their entirety.

BACKGROUND OF THE INVENTION

Field of the Invention

The present disclosure relates generally to pattern recognition of sets of one or more paths, each continuous, in two-dimensional or three-dimensional space.

Description of Related Art

Computer systems form the basis of modern society, enabling communication, financial transactions, technical activities, entertainment and all other aspects of society. Since computing power increased more and more, in most daily applications the performance of the computer system is no longer the limiting factor. For example, any desktop PC provides sufficient processing power to enable a knowledge worker to perform his tasks without requiring the human operator to wait for the machine to complete calculations. The result of many interactions between the user and the computer is completed almost instantaneously.

Instead, the user interface has become the limiting factor in work speed. The methods that allow the user to express his intention to the computer have changed little since the 1980s. Keyboards similar to a typewriter, a mouse or similar input device such as a stylus are used to control the computer (input) which displays the result of the operation on a flat, two-dimensional computer screen (output). For most work environments, such a user interface is sufficient.

However, when working with virtual three-dimensional models in the fields of design or technology, the efficiency of this two-dimensional interaction is severely limited. With a mouse or stylus, the editing of the three-dimensional model inside the computer can only be performed in two dimensions, and the representation on the screen is only a two-dimensional projection of the object. The three-dimensional shape of virtual objects appears ambiguous. Additionally, the field of view is limited to the screen which is not well suited to convey the impression of an immersive environment.

Virtual Reality (VR) enables the creation of new three-dimensional user interfaces to work with three-dimensional models or in a virtual three-dimensional world. The user can not only view the virtual model directly and spatially move the model or its components in three dimensions, but also rotate the object freely at the same time. One important part of these new user interfaces is to communicate instructions to the software by performing a gesture in free space. The term "gesture" in the present disclosure describes the motion of a body part in two-dimensional or three-dimensional space Humans use gestures naturally to convey their emotions and intentions to others and therefore are very adapt to use hand gestures and body poses to communicate. Therefore, the method of this invention of controlling a computer system by intuitive gestures is highly suitable in many applications. By merely shaking a hand it is possible to instruct a computer to perform a task like for example alphanumeric input or selecting an item from a menu.

However, the gesture language used by humans to communicate is very complex. Not only can humans distinguish a large number of gestures, they can also decide whether certain aspects of the gesture change its meaning, add additional information to the gesture, or are completely unrelated to the gesture. For example, the hand gesture used to communicate "come here" can also transmit whether it is an emergency or whether the receiver should come quietly, based on the magnitude of the hand motion.

Thus, the scale of the gesture does not change its meaning ("come here"), but provides additional information on how to perform the action. In contrast, the waving a hand from side to side is often used to communicate a "no", but when the whole arm is moved it is commonly understood as a greeting. Yet again, a "thumbs up" or "thumbs down" gesture changes is meaning with the direction (up or down) but not by the position of the hand or the motion. "Thumbs up" and "thumbs down" are the same gesture only rotated, but convey opposing meaning.

In contrast, the gesture of pointing with the index finger if affected by the direction of the gesture in that it directs the attention of the communication partner. Thus, the direction does not alter the meaning of the gesture but is used to convey the additional information. Furthermore, there are also gestures which differ in their meaning in the position in space where they are performed. For example, holding an index finger to the forehead is used to express "think", while an index finger held to the throat is used to express "kill" or "stop".

Therefore, the position, scale, and/or direction of a gesture may each either define the meaning of the gesture, add additional information to the gesture, or be altogether irrelevant to the gesture. The ease of use (usability) of a computer system could be greatly improved if it were able to distinguish gestures on these specifics. In achieving this, computer systems would be able to recognize and interpret gestures with a higher reliability while also understanding additional information included the specific way the gesture was performed. This is the case not only for those gestures already commonly used by many people but also for novel gestures which could be specifically invented to be used in human-computer communication.

In referenced Patent Document 1, a gesture-based user interface device is disclosed wherein images of the user taken by a TV camera are used as input, and via image processing detects the position of the user and recognizes the user's gestures. In referenced Patent Document 2, a method is disclosed wherein a user is wearing a head-mounted display on the head in order to operate characters in virtual space, where—depending the user's gesture—a first character in the line of sight of the user is made to perform a first operation, and a second character in the line of sight is made to perform a second operation.

Referenced Patent Document 1: Japanese Unexamined Patent Publication No. 10-255052.

Referenced Patent Document 2: Japanese Patent No. 6209252.

BRIEF SUMMARY OF THE INVENTION

The present invention has been made in view of the problems mentioned above and aims to offer a solution for efficient and effective human-computer interaction via gesture recognition.

To achieve the objective stated above, the disclosed inventions primary aspect is a method for computer systems using artificial intelligence to identify path assemblies which consist of one or more individual paths in 2-dimensional or 3-dimensional space by performing the following processing (a)~(e). (a) Accepting the input data which includes the aforementioned path assemblies. (b) Based on the accepted path assembly input data, extracting at least one of the attributes of position, size, and/or direction from the positional data of all the points of a point group consisting of points along each path, the point group representing at least one part of one or more paths of the path set. (c) Obtaining the attribute-invariant positional data of the point group of points along at the least some part of one or more paths in the path sets by transforming the points positional data inversely by the extracted attribute so that the positional data of points of that path is no longer dependent on that attribute. (d) Inserting the data set including the aforementioned point positional data along the path assemblies into an artificial intelligence as input data. (e) The output data of the aforementioned artificial intelligence being an estimate of the probability for each of a previously prepared set of possible interpretations of the received path set, the estimates being calculated by the artificial intelligence. Furthermore, the following data is used as input for the artificial intelligence (d): (d-1) positional data of the attribute-invariant point group of points along the at least some part of the one or more paths of the path set of the input data, and (d-2) at least part of at least one attribute of the attributes which have been extracted from the at least some part of the one or more paths of the path set.

The method disclosed in this application functions as follows. The body or a body part is used to form a shape or perform a motion in 2- or 3-dimensional space, which can be tracked as a path along the shape contour or position during the movement. The recognition method disclosed in this application receives the data representing such a path and uses artificial intelligence to identify the gesture as one of several previously defined gestures. The method disclosed in this application applies the following preprocessing before inputting the data into the artificial intelligence. The position of the points in the entire point group is analyzed to extract one or all of the following attributes of (1) position, (2) size, and (3) direction of the entire group of points taken together. The position of all data points in the entire point group is then transformed inversely by the extracted attribute or attributes to make the point group invariant to changes regarding the extracted attribute or attributes. Then, the positional data of the point group is used as input to the artificial intelligence along with the extracted attribute or attributes. By providing the attribute (or attributes) and the attribute invariant positional data of the point group separately, the artificial intelligence can more easily identify the gesture. According to the process disclosed in this application, at least one of the extracted attributes is used as an additional input for the artificial intelligence. In other words, at least one of the attributes of position, size, and/or direction are separated from the positional data, turning it into an attribute-invariant version of the data, which is also used as input data for the artificial intelligence. Therefore, the artificial intelligence can—for at least one of the attributes—easily distinguish whether the attribute is important to the meaning of the gesture or conveys additional information in addition to the meaning of the gesture or is completely inconsequential and may be ignored. Thus, by applying the process described in this application it is possible for human-to-computer gesture communication to be processed effectively and efficiently.

The method disclosed in this application may be used to identify a gesture from a single path as described above, but may also be used to identify a gesture from multiple successive paths. For example, a gesture consisting of first opening the hand, then drawing an arrow shape with the hand or a finger and finally closing the hand can be broken down into three stages. In this case, the first stage is the path of the shape contour of the open hand, the second stage is the path of the hand motion along the arrow-shape, and the third stage path is the shape contour of the closed hand. Each of the three paths forms a separate but in itself continuous path. The three paths may be separated, adjacent, or intersecting but are used as separate input data sets. The method disclosed in this application receives the data representing such a path set and identifies the meaning (that is the gesture expressed by the complete set of paths) from a number of previously prepared meanings by using an artificial intelligence. The method disclosed in this application performs the previously explained pre-processing to at least part of one or all of the paths in the path set by extracting at least one of the attributes of (1) position (location) (2) size (scale) and (3) direction (orientation, rotation) of the point group representing the path and inversely transforming said point group to be invariant to changes in that attribute. Then, the transformed point group data representing the path sets is used as input data for the artificial intelligence together with the extracted attributes. The input data for the artificial intelligence includes both the attribute invariant point group data and the extracted attributes as separate data entries. Therefore, as explained previously, the artificial intelligence can easily recognize the meaning of the gesture part or category of path of which the attribute was extracted. This in turn makes it easy to identify the meaning of the entire gesture consisting of several gesture elements. Moreover, at least one of the extracted attributes is used as additional input data for the artificial intelligence. In other words, at least one of the attributes of the point group is calculated, used to inversely transform the point group into an attribute invariant version of the data and then used as a separate input together with the attribute invariant data. Therefore, for at least one of the attributes, the artificial intelligence can easily decide whether that attribute changes the meaning of the gesture, conveys additional information with the gesture, or whether it is inconsequential and can be ignored. Thus, by using the system described in this application, human-to-computer gesture communication can be achieved effectively and efficiently even when the gesture consists of a multitude of paths of different types. Note that performing the process for at least one attribute of at least one part of one path can be sufficient. For example, it is possible to extract at least one of the attributes of every part of the set of paths, or of just one of the parts of one path of the path set.

The method described in this application can be used not only to identify gestures, but to identify any kind shape or motion which can be represented as a 2-dimensional or 3-dimensional path. For example, recognizing an arbitrary object by its contour shape or identifying the type of an aircraft by its motion pattern are also potential applications of this method. Furthermore, the artificial intelligence used by the computer system described in this method may be built into a program which runs on the computer system itself or may be separated from the program in the memory of the computer system or may be an external device such as for example a server in a cloud based artificial intelligence system. The method described in this application is not limited to any of those implementations. Moreover, the method according to the present invention can process path sets consisting of only a single path as well as path sets consisting of a multitude of paths (for example 3 paths), and is not limited to processing path sets according to the number of paths. Further, the term "meaning of the path set" refers to the category of the path set which is one of several predefined categories. Thus, "identifying the meaning of the path set" means that the path set is identified to correspond to one of the categories more closely than the other possible categories. If each path in the path set represents a contour shape or motion of a gesture, then "meaning of the path set" can be understood as "meaning of the gesture" of one of the predefined gestures.

The secondary aspect of the present invention is a path recognition method according to the previously stated primary aspect where a computer also performs the following processing operations (f)~(h). (f) Having a learning mode and a recognition mode to be selected as a mode of operation when providing input data. (g) When the learning mode is selected as mode of operation, the input data as stored along with the desired (correct) output of the artificial intelligence and can be used as training data for the artificial intelligence, thus enabling the artificial intelligence to learn the desired (correct) category of the data. (h) When the recognition mode is selected as mode of operation, the artificial intelligence produces an estimate of the probability that the input data corresponds to each of the previously defined categories. In this configuration, when the learning mode is selected, the artificial intelligence performs learning based on the training data and when the recognition mode is selected the artificial intelligence will output recognition results which reflect the previously performed learning. In other words, by letting the artificial intelligence perform training, it is possible to obtain high accuracy recognition results.

The third aspect of the disclosed invention is a path recognition method based on the second aspect, where at least one of the aforementioned extracted attributes for at least one segment (part) of at least one path of the path set is included in the result data. According to this configuration, since at least one of the extracted attributes is included, the user of the process or the device using the process can not only determine the meaning of the set of paths but can also obtain additional information attached to the meaning. For example, if the meaning of the gesture is to move an object, it is possible to obtain information about the direction or distance of the intended movement. Note that the attribute included in the result data in this configuration can be the same or can be different from the attribute used as input for the artificial intelligence discussed in the first aspect.

The fourth aspect of the present invention is a path recognition method according to any of the aspects one through three where at least one of the attributes (b) to extract is the position, which is calculated by taking the average position of all points in the point group as the overall corresponding position and extracted for each path in the path set. According to this configuration, the physical quantity to represent the position of the entire set of points could be obtained by a relatively simple calculation of the average of the position of all points. The fifth aspect of this invention is a path recognition method according to any of the aspects one through four where at least one of the attributes (b) to extract is the size (scale), which is calculated by taking the standard deviation the distance of points from the mean and extracted for the entire point group of each path in the path set. According to this configuration, the physical quantity to properly express the size of the entire set of points could be obtained by a relatively simple calculation of the standard deviation from the mean. The sixth aspect of this invention is a path recognition method according to any of the aspects one through five where at least one of the attributes (b) to extract is the direction, which is calculated by performing principal component analysis and taking principal axes of the entire point group and extracted for each of the paths in the path set. According to this configuration, the physical quantity to adequately represent the direction of the set of points is obtained by a relatively simple calculation of the principal component analysis of the point group.

The seventh aspect of this invention is a path recognition method according to any of the aspects one through six, where the extraction of the at least one attribute (b) includes extracting the position, scale, and/or direction of the entire point group representing at least some part (segment) of each path. According to this configuration, attribute-invariant data is obtained by extracting the respective attribute(s) of position, size, and/or scale of the entire point group of each path, which can be more easily recognized by the artificial intelligence. The eighth aspect of this invention is a path recognition method according to any of the aspects one through seven, where the aforementioned at least some part (segment) of one or more paths of the path set constitutes the entire path set. According to this configuration, the attribute extraction is performed on the path constituting path set, making it more possible to recognize the path set. The ninth aspect of this invention is a path recognition method according to any of the aspects one through eight, where for at least one of the previously mentioned attributes the input data for the artificial intelligence (d-2) contains the at least one extracted attribute or attributes for at least one of the paths in the path set when entered into the artificial intelligence as input data (d-2-1). According to this configuration, all the extracted attributes are used as input data for the artificial intelligence. Since all extracted attributes are separated from the respective attribute invariant position data in the input data for the artificial intelligence, in the example case of gesture recognition, the artificial intelligence can determine whether each attribute defines the meaning of the gesture, conveys additional information, or is completely unrelated and may be ignored.

The tenth aspect of this invention is a path recognition method according to any of the aspects one through nine, where the following processing (i) is performed by the computer. (i) A predetermined number of points is selected from among the points representing each path in the set of paths which were accepted as input data. The selection of the points for said path (i) aims to minimize the difference between the corresponding path and a set of line segments connecting the selected points which represent said path for each path. According to this configuration, the point groups consisting of a predetermined number for each path are selected to approximate each path of the path set of the input data, and since the attribute invariant positional data obtained from this point group's positional data is used as input to the artificial intelligence, it is possible for the artificial intelligence to improve the accuracy of the path recognition easily without computationally expensive calculations.

The eleventh aspect of this invention is a path recognition method according to the tenth aspects, where the selection of points to represent each path is optimized by simulated annealing. According to this configuration, since the selection of points to represent each path is optimized by simulated annealing, it is possible to avoid getting stuck at a selection of points which result in a numerical local minimum which does not adequately represent the path. The twelfth aspect of this invention is a path recognition method according to any of the aspects one through eleven, where the artificial intelligence is a neural network. According to this configuration, it is possible to use the relatively simple algorithms of neural networks to achieve a high degree of recognition accuracy with a relatively simple machine learning system.

The 13th aspect of this invention is a path recognition method according to any of the aspects one through twelve, where the input data which includes the path set (a) can also include additional data. Then, the input data to the artificial intelligence includes this additional data. According to this configuration, since the input data to the artificial intelligence includes additional data it is possible to obtain a recognition result which takes this additional data into account. For example, if each path in the set of paths represents a shape contour or movement of a gesture, the gesture of "throwing an object" only makes sense when an object to be thrown is present and selected. The information about present and selected objects can be included as additional data in the input data. When this additional data is included in the input data to the artificial intelligence, the risk of false recognition of a gesture can be reduced or avoided, which increases the reliability of the recognition system.

The 14th aspect of this invention is a path recognition method according to any of the aspects one through 13, where each path of the path set used as input data represents either a shape contour or a gesture motion. According to this configuration, it is possible to recognize gestures. The 15th aspect of this invention is a path recognition method according to any of the aspects one through 14, where the process from accepting input data (a) to producing a probability estimate by the artificial intelligence (e) is performed repeatedly. Then, the input data for the artificial intelligence (d) is input into an artificial intelligence which is (d-3) selected from among different artificial intelligences based on the type of path or paths in the path set which were accepted as input data. According to this configuration, the artificial intelligence is actively selected to be suitable to the type of path or paths in the path set, allowing for efficient training of the artificial intelligence. The 16th aspect of this invention is a path recognition method according to aspect 15, where the classification includes the number of paths constituting the path set. According to this configuration, an artificial intelligence is used selectively according to the number of paths in the path set which enables the learning process to be performed efficiently.

The 17th aspect of this invention is a path recognition device comprising a computer to perform path recognition according to any of the aspects one through 16. According to this configuration, the path recognition method according to any of the aspects of this invention can be realized in the form of a device that performs path recognition. The 18th aspect of this invention is a path recognition program which can be read and executed by a computer to perform path recognition according to any of the aspects one through 16. According to this configuration, the path recognition method according to any of the aspects of this invention can be realized in the form of a computer program that performs path recognition. The 19th aspect of this invention is an intransient computer readable storage medium which can be read by a computer and contains a program for performing path recognition according to any of the aspects one through 16. According to this configuration, an intransient storage medium is used which can be read by a computer to perform path recognition according to any of the aspects described in this invention.

As described above, the present invention realizes a path recognition technology able of effective and efficient processing of gesture-based interaction between a user and a computer. The goal, characteristics, aspects and advantages of the present invention will be clarified in the following detailed description and accompanying figures.

BRIEF DESCRIPTION OF THE DRAWINGS

FIG. 1I illustrates an example of how a hand shape can be recognized.

FIG. 1J illustrates an example of how a gesture consisting of changing hand shapes can be recognized.

FIGS. 3A through 3G are process diagrams illustrating a procedure for selecting a predetermined number of points to optimally represent a set of points.

FIG. 5D is an illustration of a configuration where a neural network is used for processing gestures consisting of three strokes.

FIG. 7 is a flow diagram illustrating the data processing of an entire gesture recognition system including the processing of the disclosed invention.

DETAILED DESCRIPTION OF THE INVENTION

Figure 1A:
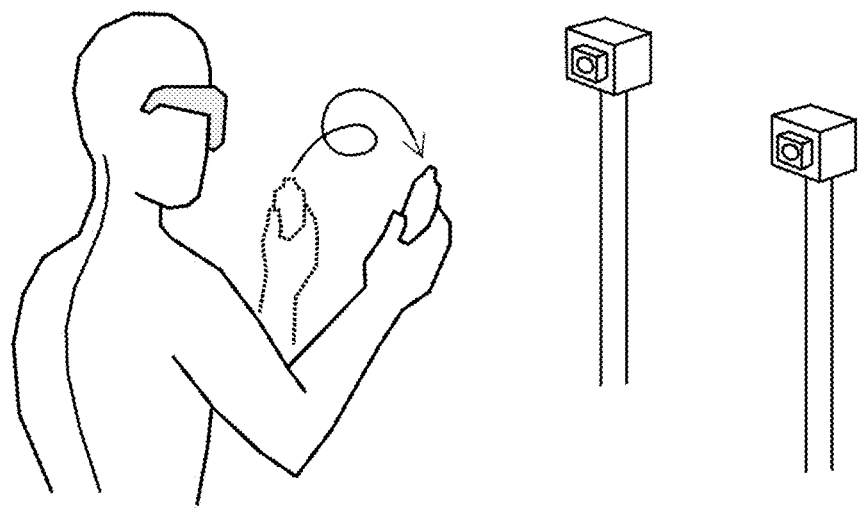
FIG. 1A illustrates a possible implementation of a user interface using gestures.
Figure 1B:
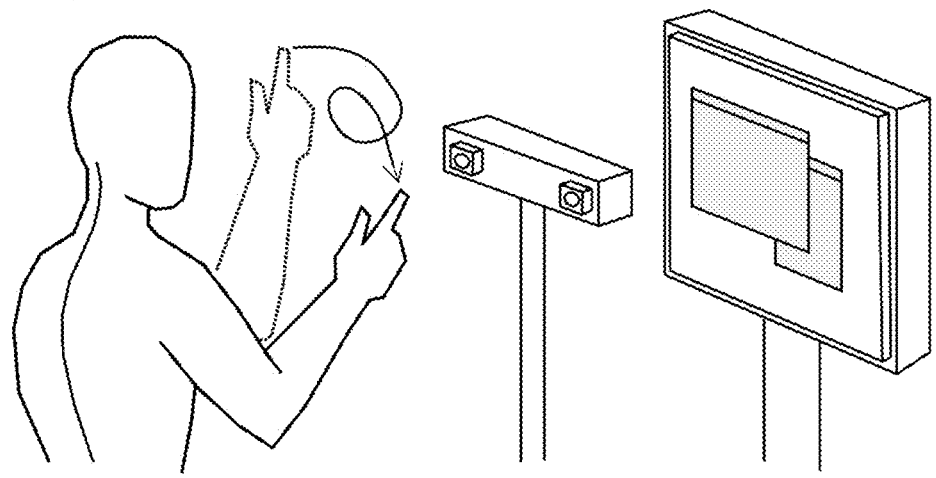
FIG. 1B illustrates a possible implementation of a user interface using gestures.

Outline of an embodiment of the invention. First, a general outline of an embodiment of the present invention will be given. FIGS. 1A and 1B show possible implementations of user interfaces using gestures. These figures are intended to give examples for possible applications of the present invention and do not represent an exhaustive list.

FIG. 1A shows a human using a Virtual Reality (VR) system by performing gestures as input. The user performs a gesture operation by moving a VR input device (controller) with the hands in free space. The user, by wearing VR headset (head-mounted display; HMD), can see a virtual world which will be affected by the performed gesture.

In FIG. 1B the user is using a hand tracking device to perform gestures as input. The user performs hand motions with bare hands and the tracking system detects the position of the hands. The user can see a computer screen where the performed gestures affect the program or world being displayed on the screen.

Figure 1C:
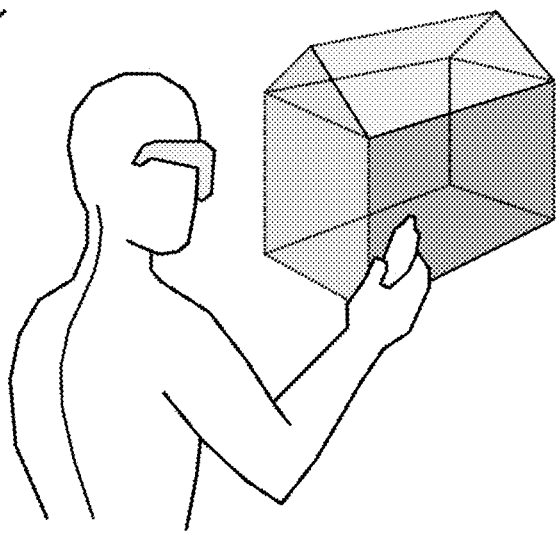
FIG. 1C illustrates an example use case of a user interface using gestures.

FIG. 1C shows an example of a user interface using gestures. The user is designing a 3-dimensional model in virtual reality. By performing gestures, the user can edit the 3-dimensional model intuitively and efficiently.

Figure 1D:
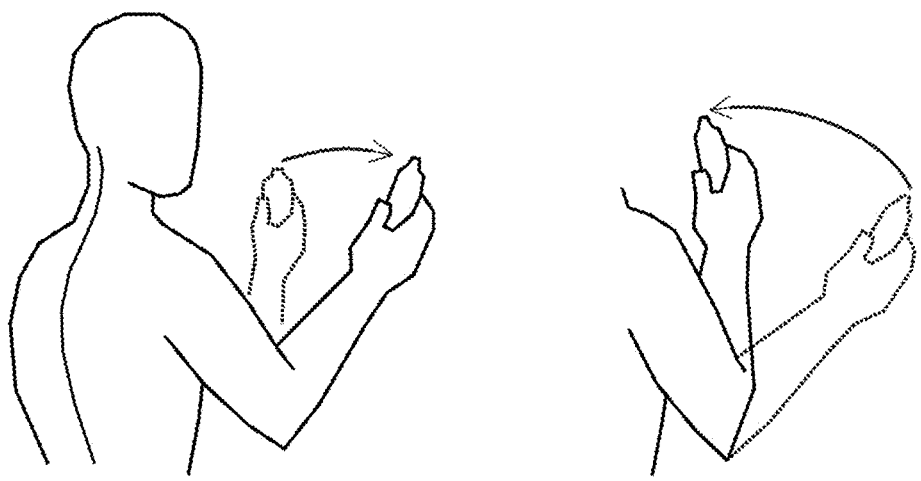
FIG. 1D illustrates a possible form of user input using a gesture.

FIGS. 1D through 1G show different possible gestures for user input. FIG. 1D shows a "swipe right" gesture (left side of the illustration) which can be interpreted by the computer system to "undo" the latest operation, and a "swipe left" gesture (right side of the illustration) which can be interpreted by the computer system to "re-do" the latest operation. In this case, the direction of the movement (left to right or right to left) is used to distinguish between the two different gestures of "Undo" and "Redo". The position of the gesture and the scale at which the gesture is performed is irrelevant and can be ignored.

Figure 1E:
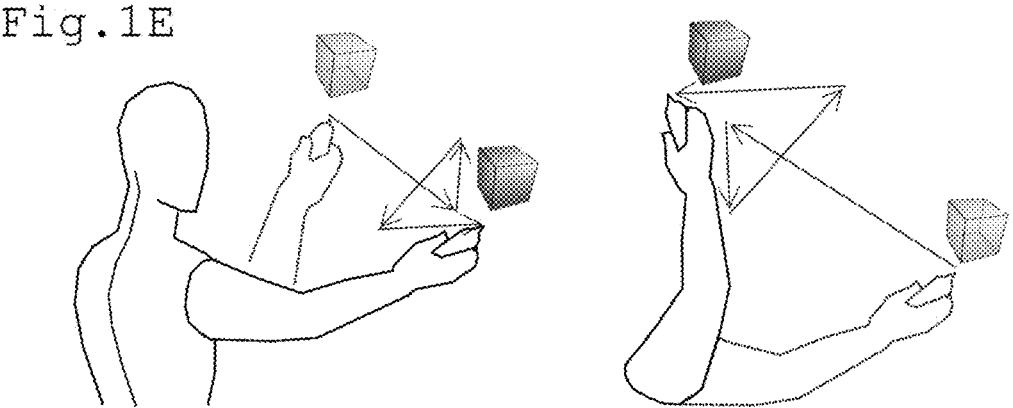
FIG. 1E illustrates a possible form of user input using a gesture.

FIG. 1E shows a "drawing an arrow" gesture used to instruct the computer to move an object which in this case is the target of the operation. On the left side of FIG. 1E the user is drawing an arrow pointing to the right, on the right side of the figure the user is drawing an arrow pointing to the left. A hand motion gesture in the form of an arrow represents the instruction "move object", while the position, direction, and length of the drawn arrow is used to indicate the target object to be moved, the direction in which to move it, and the distance of the movement respectively. In this case, the meaning of the gesture ("move object") is the same, indifferent of the direction, size, and position at which the gesture is performed. However, the direction, size, and position convey additional information to the computer system on how to perform the operation.

Figure 1F:
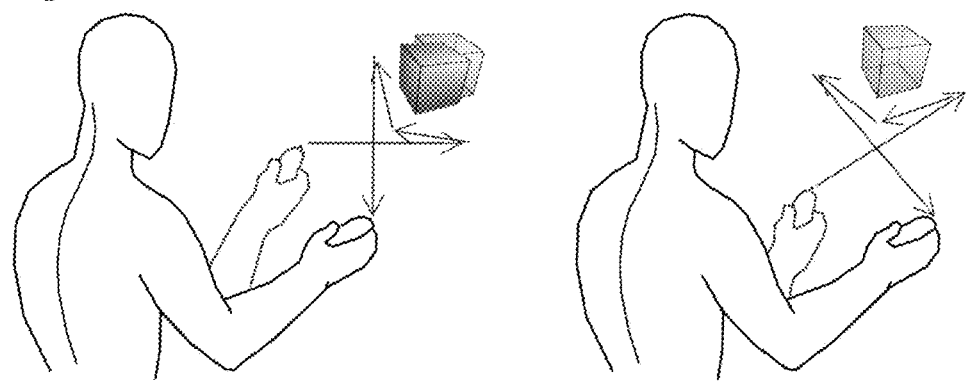
FIG. 1F illustrates a possible form of user input using a gesture.

FIG. 1F shows a "drawing a cross" gesture which—based on the orientation (rotation) of the cross—can be interpreted to mean "adding" (left part of the figure) or "removing" (right part of the figure) an object. The sign that is drawn is either a "plus" or an "x", which are identical in their shape but—differentiated by their direction or orientation—are two different gestures ("create" or "erase"). The location of the gesture is used to identify the object to be replicated or erased. The size of the gesture does not convey any relevant information and can be ignored.

Figure 1G:
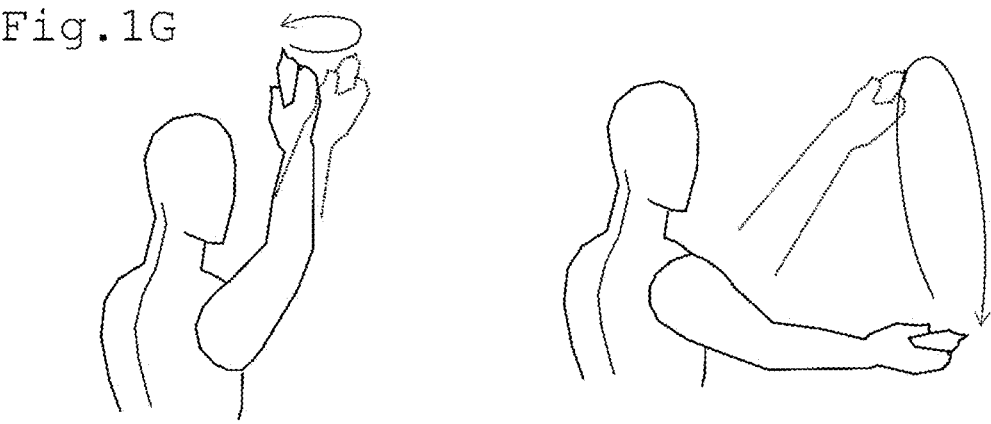
FIG. 1G illustrates a possible form of user input using a gesture.

FIG. 1G shows a scene of the user playing a game to illustrate how a circular motion can be used as a gesture. If the circle is small and above the head of the user (left part of the figure) it can be programmed to have the meaning of "summoning a mythical creature". If the circle is at shoulder level (right part of the figure) is can be programmed to have the meaning of "summoning a magical shield". In both cases, the shape of the circle is the same. The difference in meaning of both gestures depends on the position and size at which the gesture is performed. Furthermore, in the case of the "shield" gesture, the position and orientation can also be used to convey additional parameters controlling the position and orientation of the shield to be summoned.

Figure 1H:
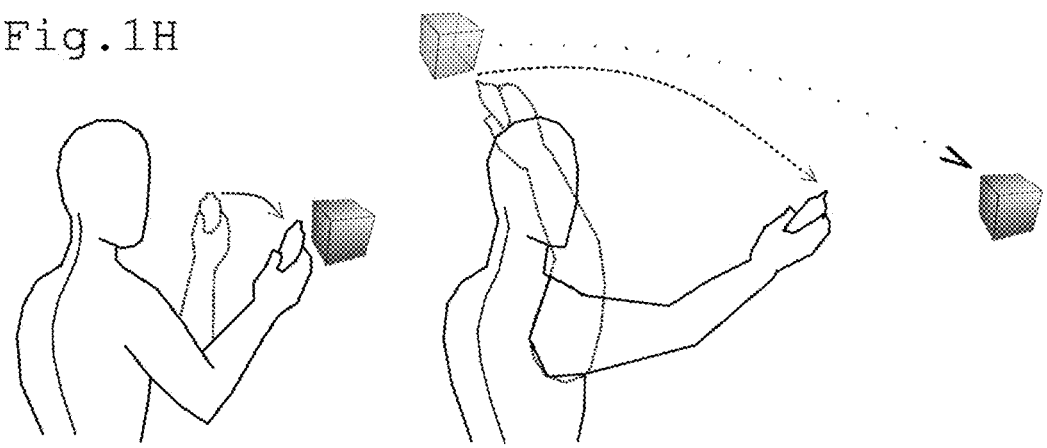
FIG. 1H illustrates a possible form of user input using two gesture strokes.

The concept illustrated above is also applicable to gestures which consist of more than one stroke. This this context, a stroke refers to one continuous gesture motion. FIG. 1H shows an example of a gesture consisting of a combination of two strokes. In this example the first stroke (shown on the left side of the figure) selects the target object, and the second stroke (shown on the right side of the figure) indicates a throwing operation. In this case, there is a possibility that the position, scale, or direction (orientation) of each of the strokes is important. In the example shown in FIG. 1H, the first stroke ("selection") is identified by its direction and scale (a small hand wave downwards). In contrast, the position of the stroke does not affect its meaning ("selection") but controls which object is to be selected. The second stroke illustrated on the right side of FIG. 1H ("throw") is recognized by its position (above the user's head), while the direction and scale are not used to identify the gesture but instead to control the direction and distance of the throw.

Therefore, the system must on one hand analyze each of the gesture's strokes individually while also recognizing that the entirety of the gesture is composed of these individual strokes.

Similar to the process of analyzing gesture motion illustrated above, the method can also be used to identify an object (the recognition target) by its shape contour. That is to say, the contour of the shape of an object can be understood as a path in space in the same way that a motion is a path in space, and can be processed by the same method as described above to identify paths in space.

FIG. 1I shows an example of how the shape contour of a hand can be treated as a path in space, thus allowing the identification of the hand shape. The left side of FIG. 1I shows the shape of the hand intended for the gesture in this example and the right side of the figure shows the shape contour used to recognize the hand shape.

If the object which is the recognition target changes its shape over time, the same method used to process a set of several paths can be used to recognize the change in shape. FIG. 1J shows an example of recognizing a hand gesture consisting of a change in hand shape by using the contour paths of the hand from before and after the motion. The left side of FIG. 1 shows the initial hand shape and its corresponding contour path, the right side of the figure shows the second hand shape and the corresponding contour path. On each side, the upper part of the figure shows the hand itself and the lower part shows the corresponding contour outline of the respective hand shape above. Even in cases where the contour of a hand is used as input data, the attributes of position, direction, and/or visual scale of the different contour shapes of the object at different times can be extracted from the shape contour path itself and can be analyzed as to whether they define the meaning of the gesture or contain additional information for the gesture or are altogether irrelevant and may be ignored.

Thus, in all the cases illustrated in FIGS. 1A through 1J the position (location), direction (orientation, rotation), and size (scale) of the gesture have different meanings. In order to recognize these gestures reliably, a computer system requires a specialized method that can adapt to these different meanings efficiently. That is, the computer system must be able to determine in which cases which of the attributes of position, direction, and size of a gesture stroke or path does affect the meaning of the gesture and which of these attributes don't affect the meaning of the gesture. The present invention is intended to meet such requirements as will be described in detail with specific examples below.

FIGS. 1A through 1J only show some examples of gesture language systems that can be used with the present invention. In these examples, the position, direction, and/or scale are sometimes characteristic of the gesture (that is, they change the meaning of the gesture) or not (in which case they may convey additional information or may be irrelevant). These examples are merely used to illustrate the importance for a computer system to understand these differences. The creation of a computer system or process that can effectively and efficiently process such gesture-based communications is very valuable in the context of human computer interaction.

Figure 1K:
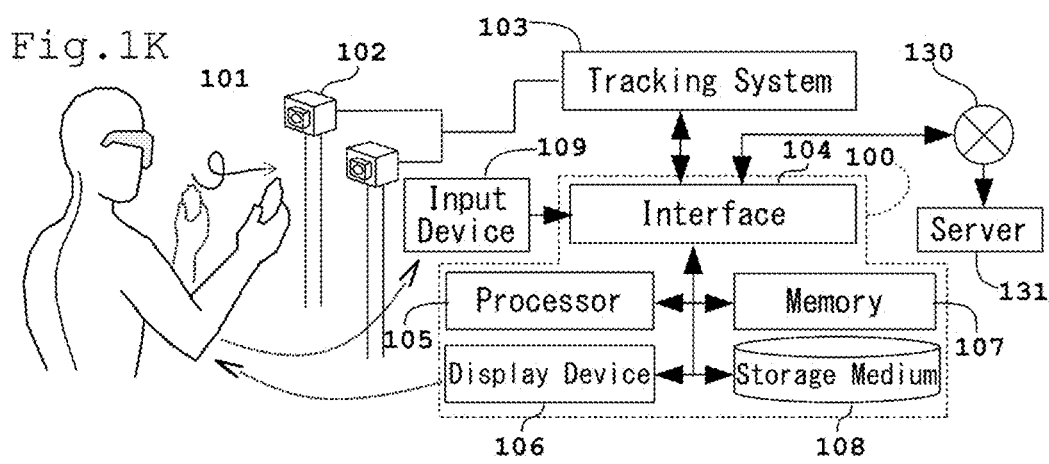
FIG. 1K is a block diagram of a possible hardware configuration of a system including a path recognition device according to the disclosed invention.
Figure 1L:
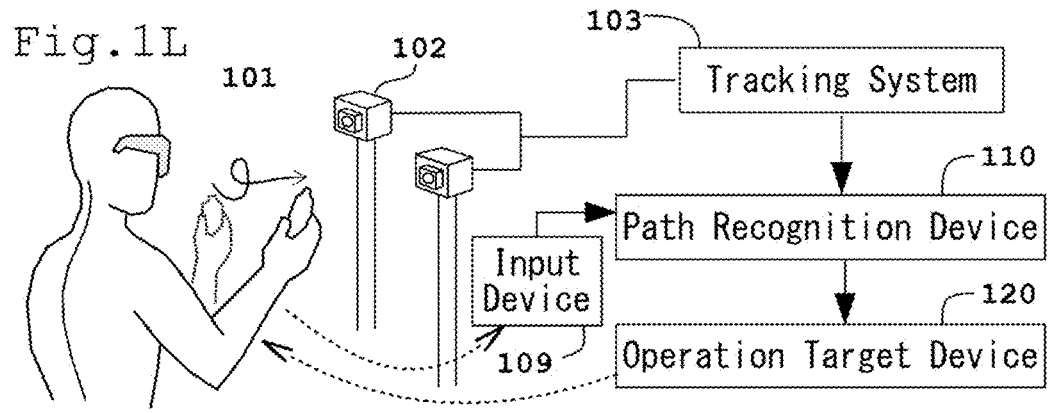
FIG. 1L is a block diagram illustrating a functional configuration of a system including a path recognition device according to the disclosed invention.

Detailed descriptions of embodiments. In the following a process that enables interactions between users and computers via gestures will be described in detail. FIG. 1K gives an example of the hardware configuration of one embodiment of the present invention including a path recognition device. FIG. 1L particularly illustrates the functional structure of the entire system of one embodiment. The user can operate an input device 101 and move it around in space. In other embodiments, instead of using an input device 101, a part of the user's body can also be used. The position and movement of input device 101 is detected and recorded by a recording device 102 which can be a camera or motion detector. The tracking system 103 computes a numerical representation of the movement of input device 101. Additional input devices 109 can be for example a computer keyboard and/or a mouse. The additional input devices 109 may also be included in the computer system 100 as one of its components. An interface 104 manages the data transfer from and to other components of the computer system 100 and the tracking system 103 and additional input devices 109. Interface 104 may further serve to connect the computer system 100 to a network like the internet 130. Thus, the computer system 100 can be connected to a server such as a cloud server 131 via a network 130. A processing unit 105 is used to perform the required operations to identify the user's intention from the gesture. Optionally, a display device 106 displays the result of the performed operation triggered by the gesture to the user. Computer memory 107, which can be semiconductor-based memory, is used to temporarily store data during system operation. A storage medium 108 (for example a hard drive) is used to store computer programs and other data. According to this one embodiment, the path recognition method can be stored in the form of a computer program in the storage medium 108 and read from the storage medium when gesture recognition is required. Accordingly, the computer system 100 includes an embodiment of the present invention in the form of a path recognition program, path recognition program storage medium, and/or path recognition device 110 as a component. Thus, it executes a path recognition method which is an embodiment of the present invention as a component of its processing. The computer system 100 includes, as one component, an operation target device 120 to execute the operation instructed by the user via gesture. The display device 106 mentioned above is one example of an operation target device 120. The target device 120 can be for example a CAD system for creating 3-dimensional design drawings. The path recognition device 110 recognizes the user's gesture performance and transmits the result to the operation target device 120. Thereby, the operation target device 120 can execute the operation indicated by the user via gesture, for example, drawing a diagram.

In the example of FIGS. 1K and 1L, the user moves an input device 101 (such as a VR controller or a wand) in 3-dimensional space. The computer system 100 receives the positional coordinates (X, Y, and Z) as well as orientation of the input device 101 as a data stream. In order for an artificial intelligence (such as a neural network) to—in the learning phase—learn a set of gestures, and—in the recognition phase—recognize gestures, this stream of tracking data is stored and processed. At that time, it is possible to determine whether the position, direction, and/or scale of the gesture motion is or is not a characteristic attribute of a gesture, or whether it conveys additional information, or whether it can be ignored. The computer system 100 contains an artificial intelligence (for example a neural network) that can learn to classify input data vectors based on a set of known gesture samples. In this one possible embodiment, the neural network is stored in the storage medium 108. In another possible embodiment, the computer system 100 may be using a neural network which is located on a server 131. A numerical representation of the gesture path (which can be a motion path or contour path) is input into the neural network. In order for the neural network to decide whether a gesture is recognizable by its position, direction and/or scale and to classify a gesture efficiently and effectively, the operational data is processed in the following steps. The order of steps (B) through (D) is arbitrary.

(A) A point group consisting of a fixed number of points are calculated which best approximate the gesture path (which can be for example a gesture motion trail or a shape contour). In one embodiment of the present invention, this process selects a fixed number of points from among the points of the original path such that a set of straight line-segments between the selected points which offer the smallest possible distances between all points and the nearest line segment. To detect these points effectively, it is possible to first select points of equal distance along the gesture path and then use simulated annealing by iteratively attempting to move one point at a time to improve the approximation.

(B) The point group is transformed into a position-invariant representation. In one embodiment of the present invention, the average position of the points in the group is calculated and then this mean point is subtracted from all points in a translation (displacement) operation.

(C) The point group is transformed into a scale-invariant representation. In one embodiment of the invention, the standard deviation from the center of the points in the group is calculated and then the points are moved towards or away from the center of the point group in a scaling operation by the inverse of the standard deviation. In this case, the standard deviation of the points of the scale-invariant representation is always '1'.

(D) The point group is transformed into a direction-invariant representation. In one embodiment of the present invention, principal component analysis is performed on the points which identifies the primary (most significant), secondary, and tertiary (least significant) axis of distribution of points in 3-dimensional space. Then, the points in the set are re-encoded regarding to their position along these three axes. That is, each point in the group will be expressed by its distance from the center along each of these three axes.

Next, the transformed points are combined into a vector, and some or all of the metadata that was generated in steps (B), (C), and (D)—which are for example the position (mean point position), the scale (standard deviation) and the direction (three axes)—are appended to the vector. This vector is then input to the neural network.

Thus, the neural network can learn efficiently and effectively for each particular gesture whether any of the aforementioned attributes are required to recognize the gesture, based on samples of the gesture. For example, the scale and direction may indicate that a different gesture with a different meaning was performed or whether it was indeed the same gesture.

Figure 2A:
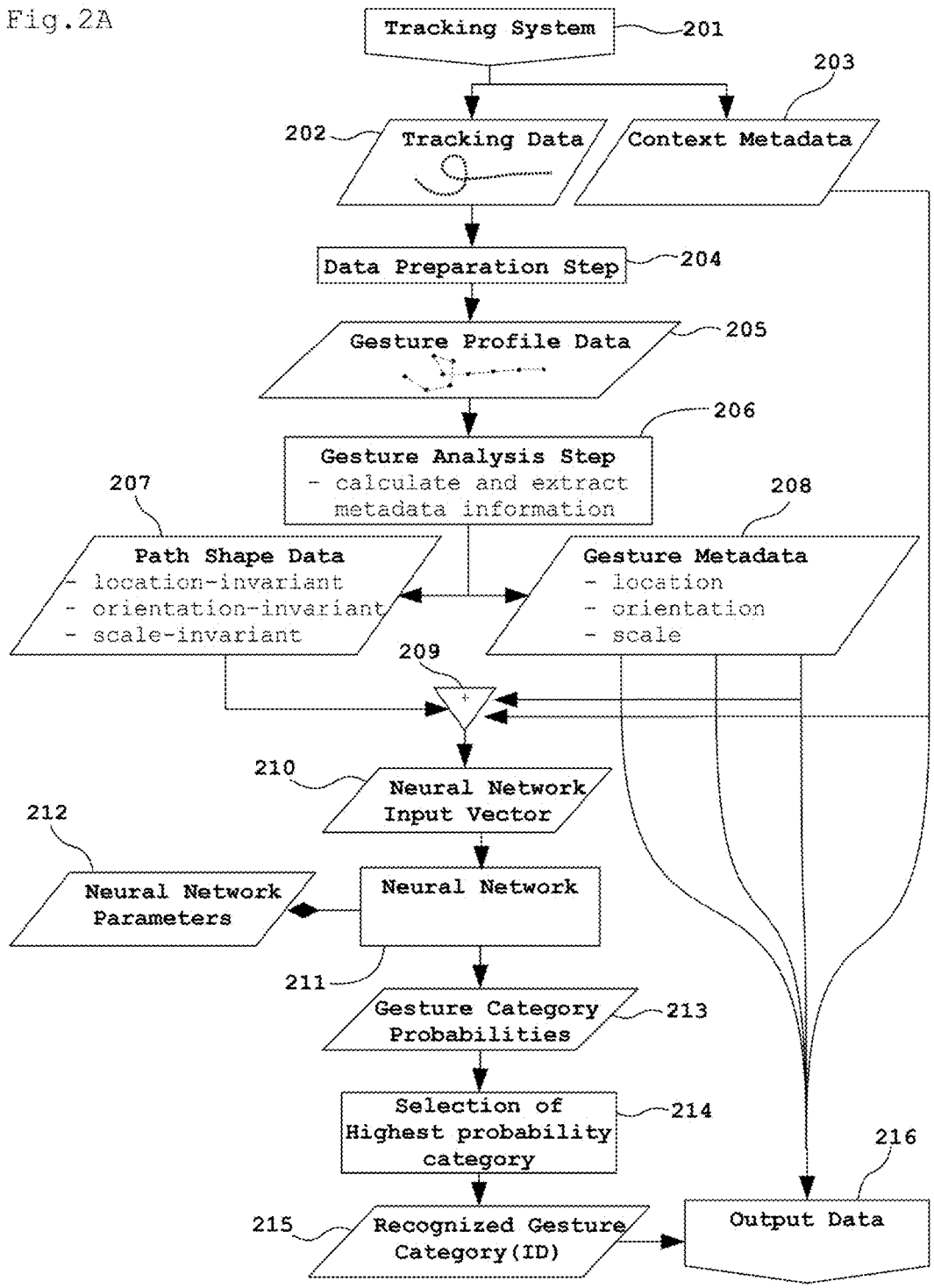
FIG. 2A is a flow diagram illustrating the data flow of an embodiment of a path recognition device according to the disclosed invention.
Figure 2B:
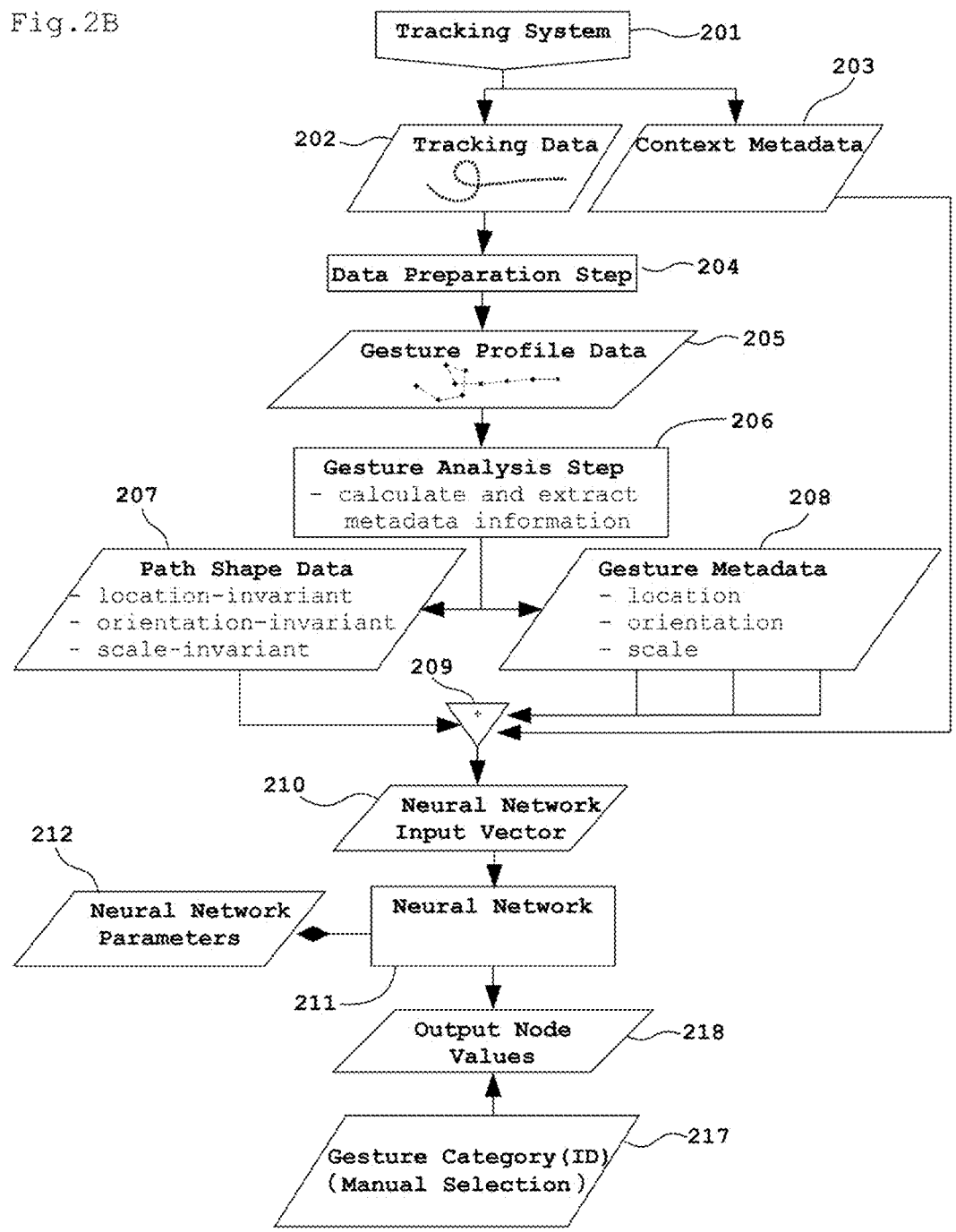
FIG. 2B is a flow diagram illustrating the data flow of an embodiment of a path recognition device according to the disclosed invention.

FIGS. 2A and 2B shows the operational data flow of an embodiment of the gesture recognition device 110 as contained in the computer system 100 as an element. In step 201, some tracking system 103 (see FIG. 1K) provides input data for the computer system 100. The tracking system 103 may be any kind of VR device—such as an HMD, controller, or motion tracker, or motion detection camera—or a storage device with pre-recorded operation data.

The tracking data 202 of the input device 101 is the input data for the path recognition device 110 contained in the computer system 100. The coordinate system used as the frame of reference for the tracking data 202 is—in one embodiment—defined by the tracking system 103 as the position of the recording device 102 (see FIG. 1K). In another embodiment, a reference system based on the point of view of the user performing the gesture is used by the tracking system 103. In this case, the motion of the tracked input device 101 is encoded as relative motion with respect to the reference point by transforming the coordinate system of the tracking data 202. That is, the coordinate system of the tracking data 202 is converted into the coordinate system of the user's point of view. This processing is performed by the tracking system 103. The reference point, for example the headset worn by the user, is obtained by detecting the viewpoint of the user. Since such a coordinate system conversion is well-known, a detailed description will be omitted. In some embodiments, the tracking data 202 consists of an undefined number of points. In some embodiments, the tracking data 202 take the form of the positional coordinate system values of the input device 101 over time or the transformation matrices or Euclidean vectors describing the position and rotation quaternion. Furthermore, the tracking data 202 may for example be expressed in relation to a specific reference point—such as the viewpoint of the user—or may be transformed into a specific coordinate system. In another embodiment, the tracking data 202 may also be in the form of a function approximating the tracked motion path such as for example a polynomial.

Context information 203 may be also provided by the tracking system 103 as additional data. The context information 203 is not part of the gesture itself but is metadata that is potentially related to the meaning of the performed gesture. For example, context information 203 may represent whether a button on the input device 101 was pressed during the gesture performance or which gesture was performed before the current gesture performance. Context information 203 is optional and not necessarily present in all embodiments of the present invention. Operation mode selection which selects either learning (training) mode or recognition mode for the path recognition device 110 may for example be provided from the user through input device 101 or input device 109.

In order to make the comparison of gesture paths by machine learning easier, a simplified representation is computed in the data processing step 204. This simplified representation consists of a group of data points of a predetermined number 205. In some embodiments of the present invention, this data processing step consists of an initial guessing step followed by simulated annealing. This will be explained in detail later.

Then, in the path analysis step 206, the point group is analyzed in its position (spatial location), direction (spatial orientation) and scale (spatial dimension) in order to extract this information. The resulting path shape data 207 is a representation of the shape itself at a fixed size indifferent as to where the gesture was made, in which direction it was made, and at what scale it was made. Thus, gesture recordings of gestures of similar shape will produce very similar path shape data 207. The gesture path position, direction and/or scale which was calculated and extracted in the path analysis step 206 is stored separately as gesture path metadata 208.

In process 209 the various data sets are combined into the neural network input vector 210. In the input vector 210 some or all of the previously calculated metadata are included. Thus, the shape information of the gesture path itself 207 and the meta information 208 of where (position), in which direction and/or at what scale the gesture was performed are combined into the new input data vector 210 which is generated in this process 209. If necessary, additional context information 203 which was acquired by the processing 201 of data from the tracking system 103 can also be included in the input data vector 210.

Next, the input data vector 210 is processed by an artificial neural network (ANN) 211 based on a predetermined mode of operation. In the learning mode, when the category or meaning is known, the input vector 210 is used as a sample of that particular gesture, and in the recognition mode it is used to identify the unknown gesture. The neural network 211 uses a parameter set 212 to perform the operation. As will be described in detail later, the parameter set 212 is the result of machine learning and can be improved through the learning operation.

If the path recognition device 110 is used to identify a new unknown gesture performance (that is when the operation mode is the recognition mode), the neural network processing 211 is performed to find how the gesture relates to the various gesture categories which were examined in the learning phase ("gesture category" being the appropriate technical term for the type of gesture previously also referred to as the meaning of the gesture). The output neurons (neurons of the output layer) of the neural network provide a set of values 213 which can be understood as estimates of the probabilities that the unknown gesture belongs to each category.

Then, in processing step 214, the path recognition device 110 can select the gesture category with the highest probability as the most likely meaning (category) for the unknown gesture. Alternatively, if there is no sufficiently high probability estimate for any known gesture category, an error message can be generated. If a gesture category is selected as the most likely gesture category, then the category identifier (ID, index) 215 is the output value of the path recognition device 110.

Next, the path recognition device 110 constructs a complete set of output data 216. This output data set contains the gesture category identifier 215 and can also contain the gesture path metadata 208 as well as the tracking context information 203.

FIG. 2B illustrates the operation of the path recognition device 110 during learning mode. The path recognition device 110 selects the operation mode to be either the recognition mode or the learning mode based on the operation mode selection data as previously mentioned. In the learning mode, the user may for example perform gestures as samples for the neural network to learn. Processing and generation of the input data vector 210 from the input data 202 and 203 are the same as in the recognition mode. Also, the neural network processing 211 calculates the output neuron values (values of neurons of the output layer) as in recognition mode. Furthermore, the correct (intended) gesture category 217 is given by the user for the learning data samples. These learning data identifiers 217 are for example provided by the user of the input device 101 or input device 109 to the path recognition device 110. Based on this information, the output neurons (neurons of the output layer) values are defined to "1" for the correct (intended) gesture category and to "0" for all other categories. The output values calculated by the neural network process 211 from the input vector 210 and the correct values for the output neurons are then compared, and—based on the discrepancy—the neural network parameters 212 are updated in their weight and bias values for the various neurons and neuron layers to improve the probability of correctly predicting the gesture category during recognition mode. Furthermore, during learning mode the neural network process 211 can also adjust the number of neuron layers and number of neurons of each layer in the neural network parameters 212 to achieve optimal results. Since this procedure is well known in the field of computer science a detailed description will be omitted.

FIGS. 3A through 3G shows an example of the processing step 204 which attempts to find a set of points to optimally represent a gesture path, according to one embodiment. FIG. 3A shows the path data 202 as input data. In the illustrated example, the input data is a series of points along the path of a gesture motion performed by the user. The number of points is arbitrary and may vary depending on the length and speed of the user's performance of the gesture. A fixed number of points which optimally represent this path while maintaining as much detail as possible are found by the algorithm exemplified below.

In the first step shown in FIG. 3D, the desired number of fixed points are selected by selecting points of equal distance along the path. Then, this first estimation is iteratively improved by simulated annealing. That is, one point among the selected points is randomly moved along the path in a random direction and distance and tested as a possible improvement in the simulated annealing process (see FIG. 3C). In the step shown in FIGS. 3D and 3E, the path recognition device 110 calculates and compares the error between the path and line segments before and after the random point is moved. Here "error" is defined as the distance between the points of the path as shown in FIG. 3A, and the closest of the line segment between the selected points. If the new point proposed by the random point motion is less than the error before the random motion, then the change is accepted and the simplified path is updated (see FIG. 3F). Conversely, if the error of the new point after the random motion results in a higher error than before, then a random number is generated. If this random number is greater than a threshold then the update is not performed and the previous point position is maintained. If the random number is smaller than the threshold value, then the update is performed even though it results in a worse representation of the path. This step is executed in order to avoid getting stuck in a local minimum.

In either case, the system updates its selection of random points by repeatedly proposing random motions along the path for random points as shown in FIG. 3C. This cycle is repeated a number of times in order to find a useful representation of the gesture path. The threshold value is reduced at each repetition of the cycle, decreasing the likelihood that a random motion which increases the error is accepted. FIG. 3G shows the final result obtained after several repetitions. This set of points allows comparing different gesture paths in a useful way that is likely to represent the gesture paths appropriately.

Figure 4:
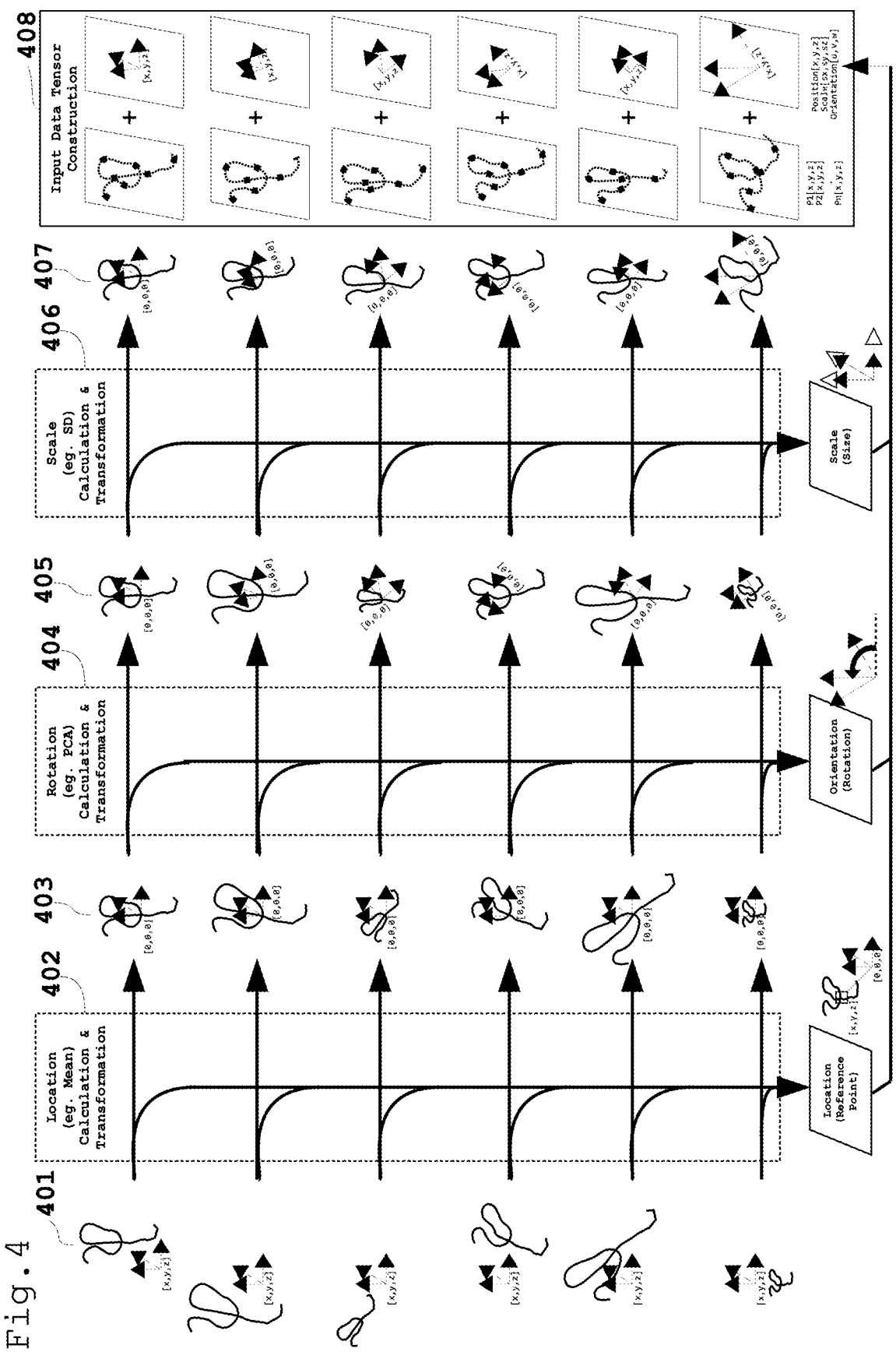
FIG. 4 is an illustration of the process of extracting attributes from paths and transforming the paths to be attribute invariant.

FIG. 4 illustrates how gesture paths are processed as described in steps 205 through 209, by showing several example paths being processed. FIG. 4 is intended to illustrate some gesture path processing according to one embodiment of the present invention and is not intended to limit the scope of the invention nor is it necessarily numerically accurate. For the illustration, the gesture path is represented as a curve in a 2-dimensional plane. However, the present invention is not limited to 2-dimensional gesture motions and the same process can be applied to 3-dimensional gesture paths. Furthermore, the order of processing steps 402 through 406 is arbitrary and not intended to limit the present invention to any particular order. Several gesture path representations consisting of a limited number of points—as can be obtained by process 204 (see FIG. 2A)—are depicted in 401. Since the gesture paths received as input 401 represent different gesture performances, they are expected to differ in position (location), direction (rotation), and size (scale). The leftmost column of the figure depicts six examples of possible gesture path data 401. Arrows represent the coordinate system origin relative to which each gesture path was recorded.

To a human observer, the similarity between the gesture paths is obvious, but in a numerical analysis of the data points of the gesture paths 401 it would be difficult to detect the similarity because of the differences in position, direction, and scale. In step 402, the average point position or center of gravity 411 of each gesture path 401 is calculated, stored, and subtracted from all the data points in the gesture path representation 401. The resulting data sets 403 obtained by step 402 have thus been transformed to be located at their respective center of gravity, but still differ significantly in their direction (rotation, orientation) and size (dimension, scale).

In step 404, the direction (orientation) 412 of each gesture path is calculated. In some embodiments, the orientation of a gesture path is determined by calculating the axes of greatest and smallest variance by principal component analysis. The calculated direction (orientation) of the gesture paths 403 is stored separately 412 and used to transform the data points of the gesture path to neutralize the direction by inverse rotation. In other words, the coordinate values of all data points in each gesture path are converted into coordinate values of its respective position along each axis of a reference coordinate system including the rotation 412. The resulting data sets 405 obtained by step 404 are now rectified in their rotation but still differ in size (scale).

In step 406, the size (scale, dimension) 413 of each gesture path is calculated and stored separately from the gesture path data 405. In some embodiments, the standard deviation or variance of the data points of the gesture path 405 is used as measurement of scale 413. The measurement of scale 413 may be a single value or may be a set of values such as the scale along each dimension (coordinate system axis). When the measurement of scale 413 is a single value, it may for example be the standard deviation of the distances of the points in the gesture path from the center of gravity (mean) of the gesture path. This measurement of scale 413 is used inversely to transform all points of the gesture path in order to achieve a new representation of the data path that is uniform in its scale. The points of the gesture path 407 which was obtained in step 405 are moved with respect to the coordinate system origin and coordinate system orientation (rotation axes) to produce new gesture path data of unit scale 407. Thus, the coordinate values of the data points of the gesture path representations 407 have been adapted to make them simple to compare numerically between different gesture performances. The points of the gesture path representation 407 now only represent the shape of the gesture path itself, independent of the position, direction, and scale at which the gesture was performed.

In step 209 (see FIG. 2A) the input data vector 408 (corresponding to the input vector 210 in FIG. 2A) for the neural network is constructed by concatenating the data points of the gesture path shape representation 407 (obtained from step 406) and the previously calculated numerical measures of position (location) 411, direction (orientation) 412, and scale (size) 413. It is noted that the data points of the gesture path shape representation 407 are a sparse set of n-dimensional data points and not an image of the gesture operation. Therefore, the number of numerical values to represent the gesture path shape are relatively small and have a well-defined order from the starting point (first point) to the end point (last point) of the gesture performance. As described above, this example uses the average position of the points of the gesture path 401 as location 411, the vectors of maximum and minimum variance obtained by principal component analysis as direction 412 and the standard deviation from the mean as scale 413. The average position of the points adequately represents the position of the gesture path 401 and also has the added benefit of being obtainable by a relatively simple calculation. The axes of greatest and smallest variance adequately represent the direction (orientation) of the gesture path 401 and also has the added benefit of being obtainable by a relatively simple calculation. The standard deviation from the mean of the data points adequately represents the scale of the gesture path 401 and also has the added benefit of being obtainable by a relatively simple calculation. In particular, if the average point position is used as reference location 411 and the standard deviation is used as measurement of scale 413, then the coordinates of the gesture path shape representation 407 (which are used as the input values 408 for the neural network) will have an average distance of 1 from the center. For the logistic function—which is commonly used in neural networks—it is desirable that the input values do not deviate significantly from the range of −1 to +1. Therefore, if the average point position is used as reference location 411 and the standard deviation from the mean is used as measurement of scale to transform the data points of the path shape representation 407, the numerical values are particularly suitable for the logistic function. However, the present invention is not limited to the methods of obtaining reference position 411, rotation 412 and scale 413 outlined in this example. For example, the reference position 411 may instead be chosen to be the starting point or the end point of the gesture path 401.

Figure 5A:
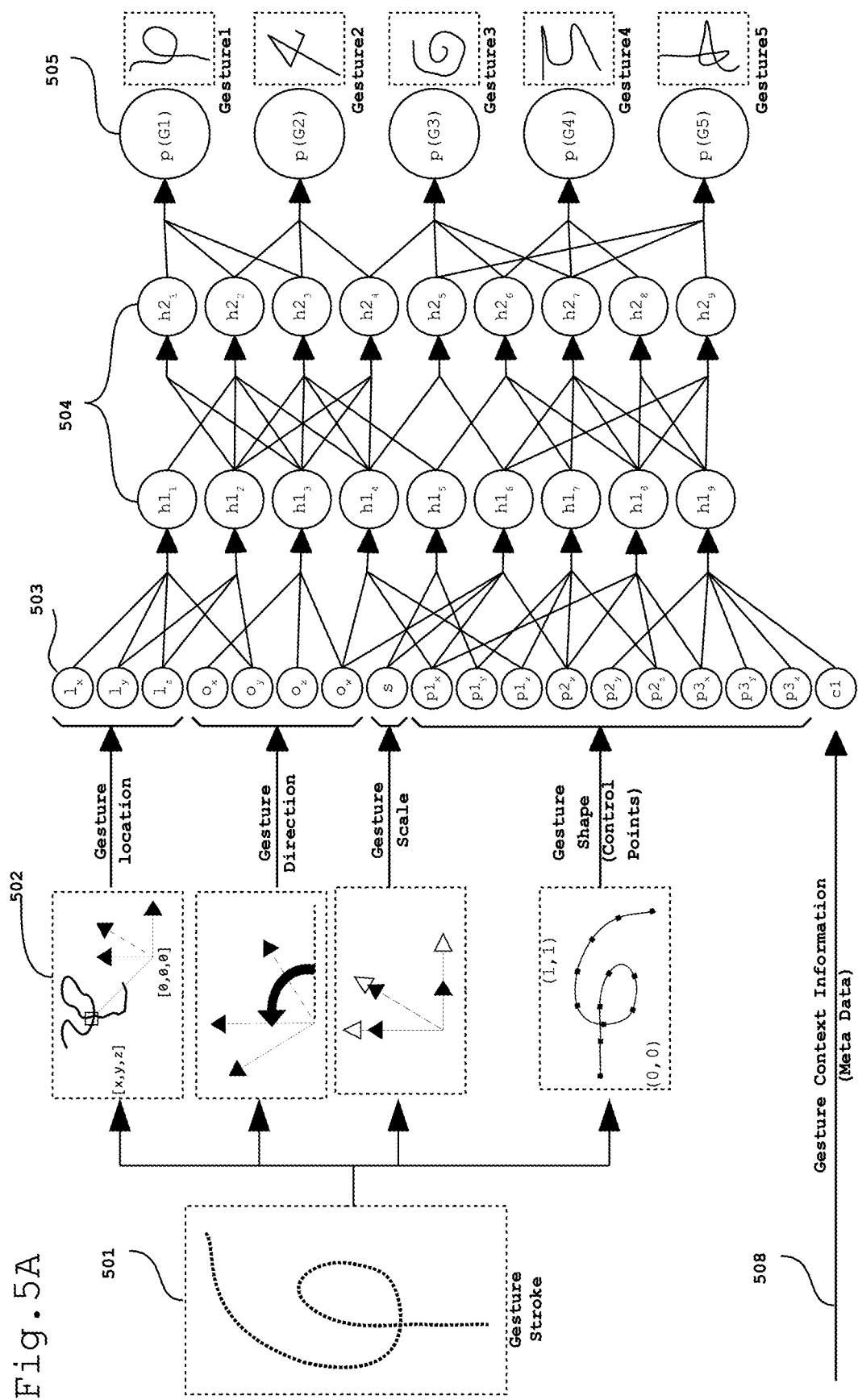
FIG. 5A is an illustration of how a neural network can be used in an embodiment of the disclosed invention.
Figure 5B:
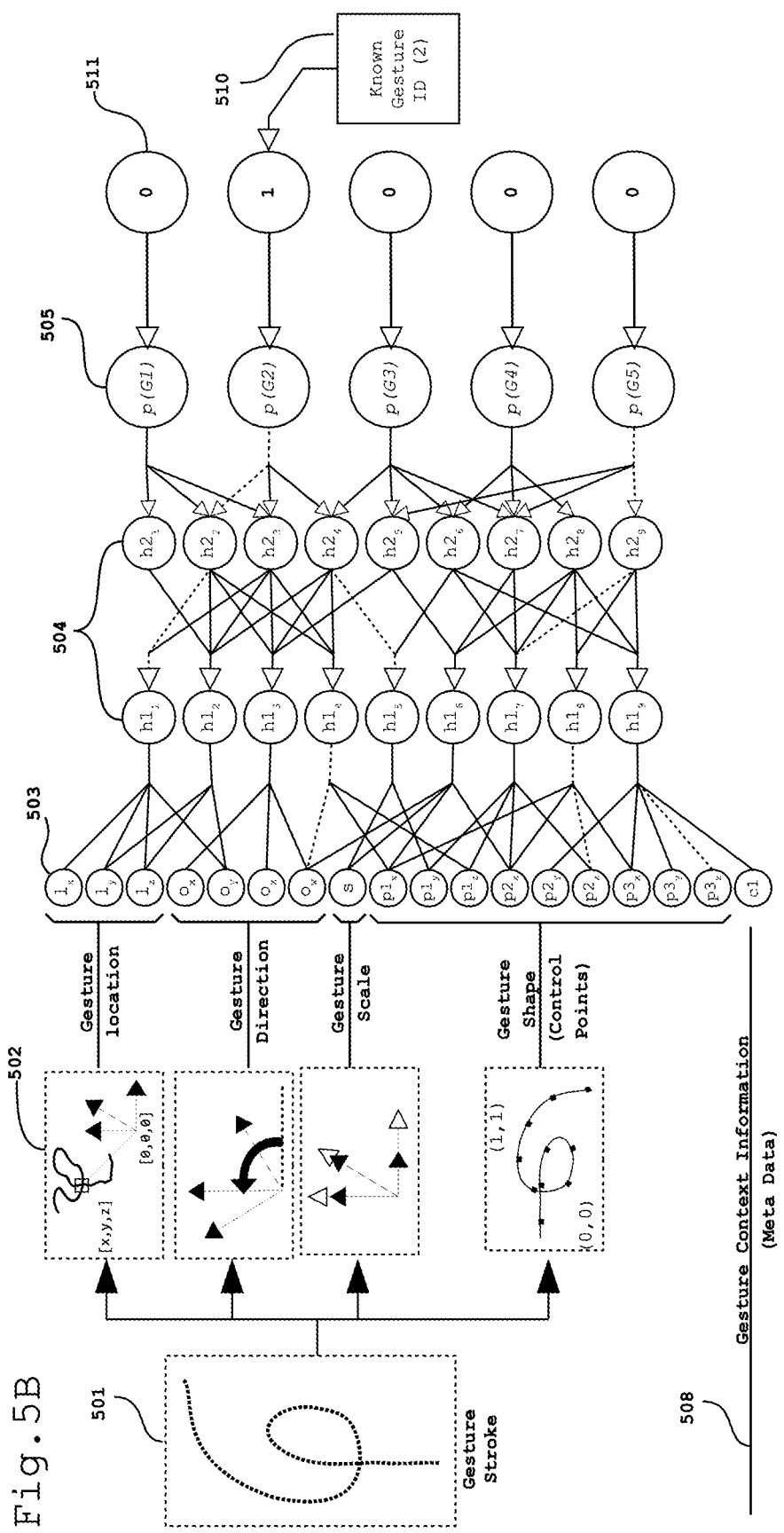
FIG. 5B is an illustration of how a neural network can be used in an embodiment of the disclosed invention.
Figure 5C:
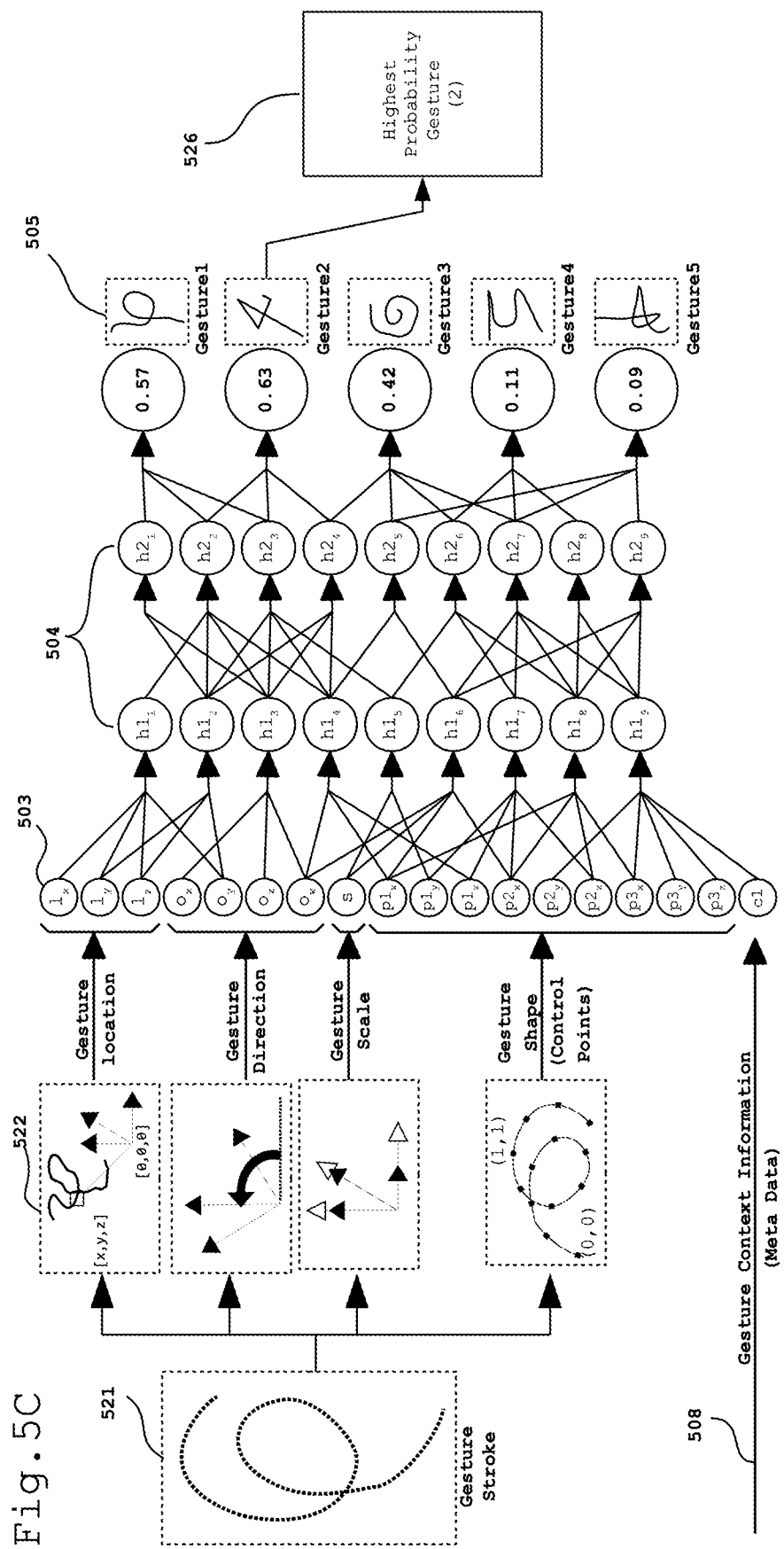
FIG. 5C is an illustration of how a neural network can be used in an embodiment of the disclosed invention.

FIGS. 5A through 5C illustrate the example of a neural network being used in one embodiment of the present invention. As illustrated in FIG. 5A, a gesture consisting of one gesture path 501 is processed to obtain the position, direction, scale, and gesture path shape data 502 of the gesture path 501. A vector is composed of the numerical values of these data 502. This vector provides the input values for the input nodes 503 of the neural network. Furthermore, it is also possible to append context information 508 (corresponding to the context information 203 of FIG. 2A) to the vector. In the illustrated example, the position is represented by three values (x, y, and z coordinates of the center of gravity), the direction is represented by four values (x, y, z, and w of a rotation quaternion), and the scale is represented by one value (standard deviation from the mean). In the illustrated example, the gesture shape (here, the shape of the motion path of the gesture performance) is represented by 9 values (x, y, and z coordinates of each of three control points). The group of data points of predetermined number obtained in step 204 of FIG. 2A are here referred to as "control points". This illustration is only one example to illustrate the recognition of the gesture category of a gesture performance.

Other methods of constructing the input data vector are also possible of which some examples are given here. For instance, omitting some of the data or encoding the direction (orientation) in the form of a directional vector, or separating the scale value into different values for each dimensional axis are all possible. Furthermore, the number of control points can be increased or decreased, and control points can be expressed by their position relative to the center of gravity or relative to the previous control point. Furthermore, the input data vector can include or exclude additional data such as controller rotation or button presses on the input device 101 as context information 508.

In the illustrated example, the intermediate nodes of the neural network (hidden neurons) 504 consist of two layers of neurons, nine neurons per layer. However, the number of layers and neurons is not specifically defined or limited in the present invention and may be chosen freely to optimally suit a specific set of gestures. The neurons of the hidden (intermediate) layers 504 are each connected to the neurons of the previous layer, with each connection having an associated weight value representing how strongly the value of the connected neuron influences the value of the neuron itself. The output value is calculated by taking a weighted sum of the input values and a bias value and then applying an activation function such as the well-known sigmoid function or hyperbolic tangent function.

In output layer 505 of the neural network, each output neuron is associated with one gesture category. In the illustrated example, five gesture categories (G1 through G5) are known to the neural network artificial intelligence. After the calculation of the output values of all layers is completed, the values of the output layer neurons 505 can be used as an estimate of the probability that the input gesture path 501 belongs to each of the corresponding gesture categories (p(G1) through p(G5)).

Based on this calculation, it is possible to initiate the learning process. In the learning process, the biases and weight coefficients of the nodes of the neural network are adjusted to maximize the probability of the neural network identifying the correct gesture category. As illustrated in FIG. 5B, the correct gesture category 510 is decided by the user. The gesture category in training 510 is used to provide the correct values for the output nodes 505 of the neural network by setting the output node associated with the correct category 510 to "1" and the other output nodes to "0". Based on the differences between these correct node values 511 and the values calculated by the neural network 505 based on the input vector, the weights and bias values of the connected neurons 504 are updated via the backpropagation method. This means that the weight values or some connections (nodes) are decreased and the weight values of other connections (nodes) are increased. The training process attempts to make the highest value among the output neurons (output nodes) calculated by the neural network based on the input vector correlate with the gesture category selected by the user to be the correct category, by repeatedly updating the weights of connections (nodes) using a sufficient number of gesture operation sample recordings of each gesture category.

In FIG. 5C, a different gesture performance 512 is shown as an example. This gesture performance 512 differs somewhat from the gesture performance recording 501 used in FIGS. 5A and 5B. Therefore, the numerical data 522 which resulted from the gesture performance differs from numerical data 502 and the input vector for the input nodes 503 also differs from the input vector in FIGS. 5A and 5B. After the values of all neurons—including the intermediate (hidden) neurons 504—is calculated, the values of the neurons of the output layer 505 can be used as an estimate of the probability that the performed gesture belongs to each category. A path recognition device 110 can select the gesture category with the highest value and output it as result data 526.

FIG. 5D shows an example of a neural network that can handle combinations of three gesture performances (paths). Gestures consisting of several parts were for example illustrated in FIG. 1H. The example gesture being processed 527 is a combination of three gesture strokes. The three gesture paths 528 are processed separately. For each of the paths, the position, direction, and size of the path are calculated and the path data is transformed to produce a path shape representation that is invariant to the position, direction, and size of the gesture performance. This numerical data 529—which is a set of control points for each of the gesture paths—are combined with the metadata (position, direction, and size) into one single input vector, which is inputted into the neural network input nodes 530. The neural network processes the input data vector through a series of intermediate (hidden) nodes. The output of the neural network are the values of the nodes of the output layer 532 which represent the known categories of gestures (five in the illustrated example). Each output value can be used as an estimate of probability for the respective category. From these values, it is possible to select the category with the highest probability estimate.

FIGS. 6A through 6E show an example of numerical values of two example gestures "Sample 1" and "Sample 2" being processed. In the illustrated example, each gesture is 2-dimensional, consists of only one stroke (path) and is represented by only four data points (control points) "1" through "4". This very simple example has been chosen to simplify the explanation and is not intended to limit the present invention regarding the number of dimensions or number of data points. Furthermore, all numbers are approximations for the purpose of explaining the process and are not mathematically exact.

"Sample 1" and "Sample 2" of FIG. 6 correspond to the set of data points obtained in step 204 in FIG. 2A. "Sample 1" and "Sample 2" each consist of 4 data points "1" through "4". "1" is the starting point of the gesture path and "4" is the end point of the gesture path. To a human observer, the similarity of the two gestures is obvious. While the two gestures differ in position, size, and direction, it is clear that they are intended to express the same gesture (category). However, when comparing the two gesture data sets numerically, Sample 1 (defined by the data vector "Sample 1(x, y)" is quite different from Sample 2 (defined by data vector "Sample 2(x, y)". For Sample 1, the data vector values are [2, 9, 3.5, 4, 4, 5.5, 2, 5], and for Sample 2 the data vector values are [25, 8, 22, 1, 24, 2, 21.5, 3.5]. Here, the data vector values are the coordinates of the data points (two per point for x and y coordinate) connected in the order of the points of the gesture path.

To a computer system, it is not trivial to correctly deduct that these two sets of numeric data belong to the same gesture category. According to this embodiment, the path recognition device 110 will process the input data "Sample 1(x, y)" and "Sample 2(x, y)" in three steps which are illustrated in FIG. 6B through 6D, which produces the vector used as input data for the neural network (see FIG. 6E).

Figure 6A:
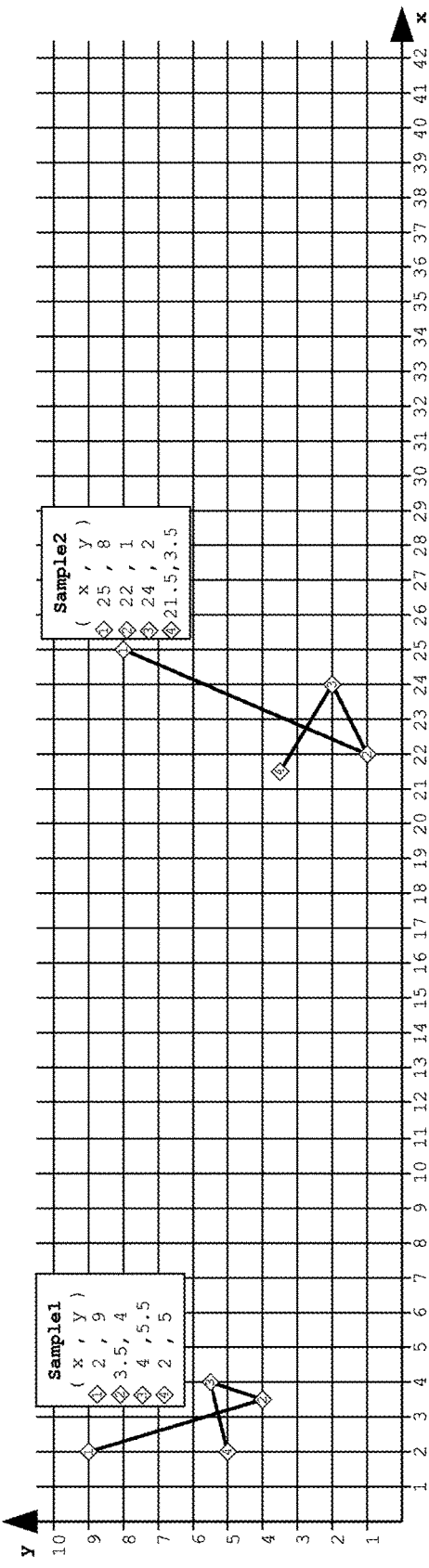
FIGS. 6A through 6E are illustrations of an example of processing numerical values of two gesture paths.
Figure 6B:
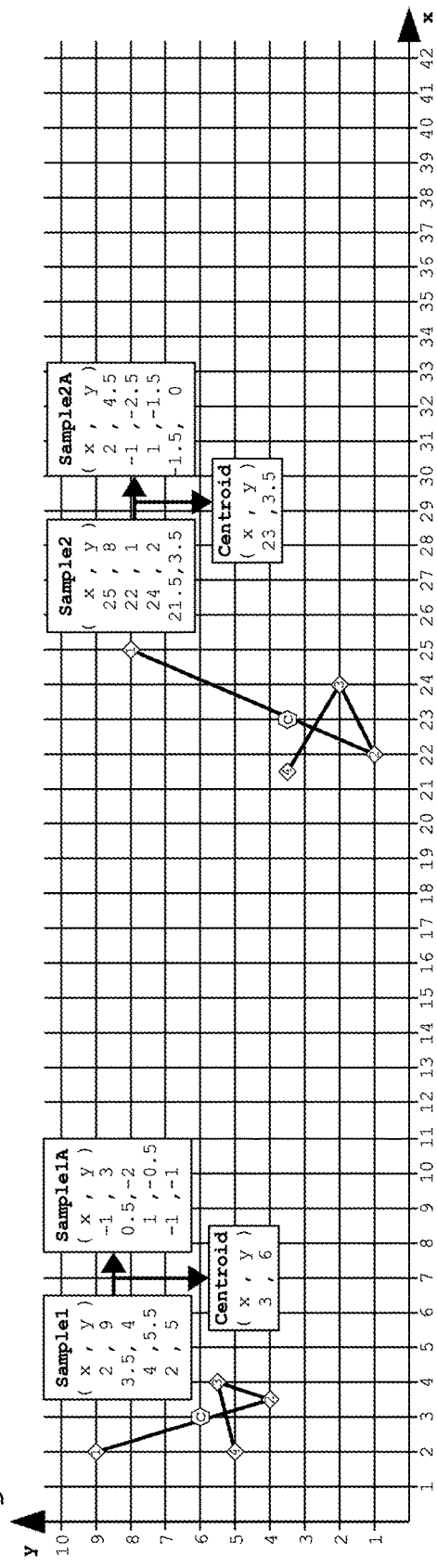

FIG. 6B shows the first processing step. Here, the center of the gesture path (center of gravity) is calculated by finding the average of all points of the gesture path. These average point coordinates are then subtracted from each point of the data vector of FIG. 6A to obtain the new transformed data sets "Sample 1A" and "Sample 2A". These new data vectors are position-invariant, which means that they are encoded relative to the position of the whole gesture path in space.

Figure 6C:
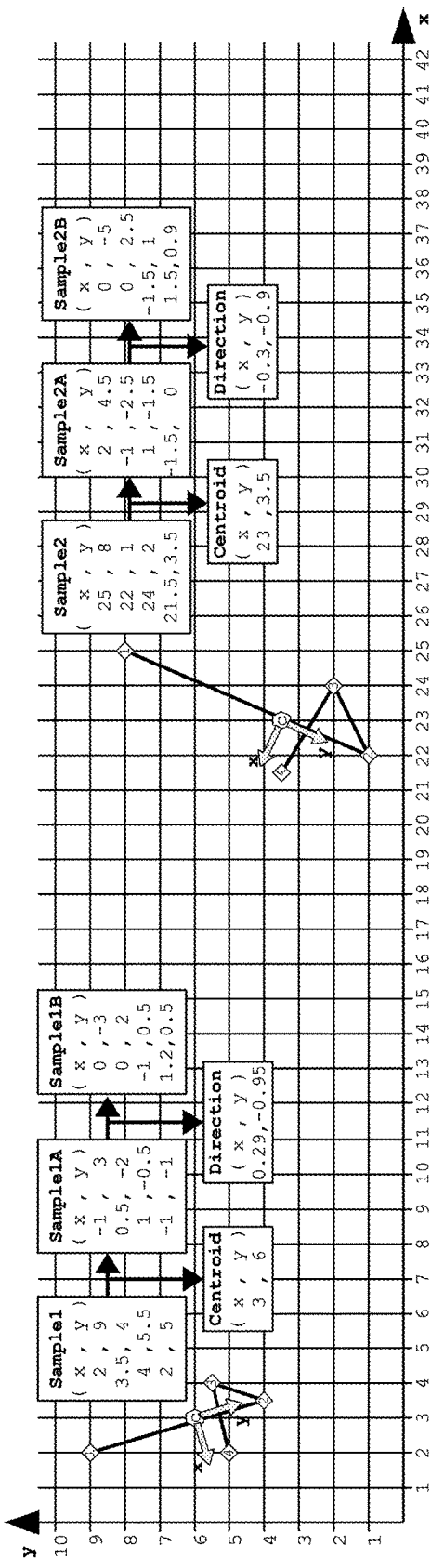

In the processing step shown in FIG. 6C, the direction (orientation, rotation) of the gesture path is calculated. Since the illustration shows a 2-dimensional example, the direction is expressed in the vector of highest dispersion (variance) of the gesture points which may be calculated by principal component analysis. This directional vector is shown in FIG. 6C as arrow "y". Together with the orthogonal vector "x", it forms a new coordinate system which is used to encode (transform) the data points again. The new data sets "Sample 1B" and "Sample 2B" which are encoded in the new coordinate system are rotation invariant, which means that they are encoded relative to the gesture path orientation in space.

Figure 6D:
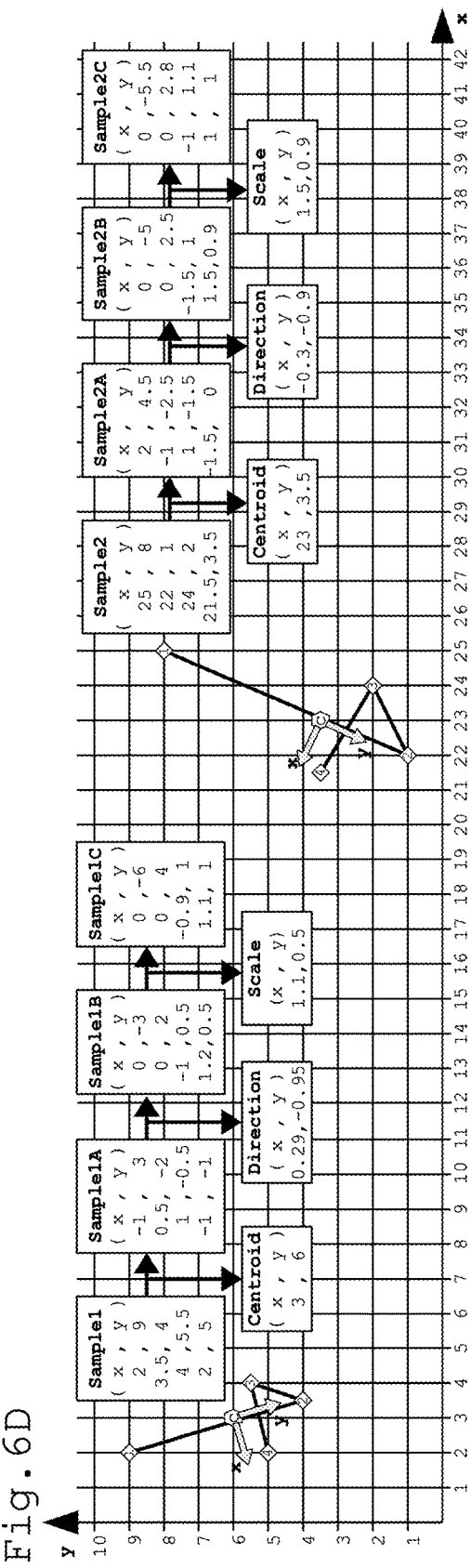

In the processing step shown in FIG. 6D, the size (scale, dimension) of the set of data points is calculated. In the illustrated example, the standard deviation along the x-axis and y-axis respectively are used as two numerical scale values. The two scale values are applied inversely to the sets of data points of the gesture path to scale them to unit size. Thus, the new data sets "Sample 1C" and "Sample 2C" are generated. These data sets are scale-invariant, meaning that they will always of the same unit scale indifferent of the size of the original gesture. In the illustrated example, the vector [0, −6, 0, 4, −0.9, 1, 1.1, 1] is generated for Sample 1 and the vector [0, −5.5, 0, 2.8, −1, 1.1, 1, 1] is generated for Sample 2. The numerical values of these vectors are very similar, which makes it easy for a computer system to understand the relationship between Sample 1 and Sample 2.

Figure 6E:
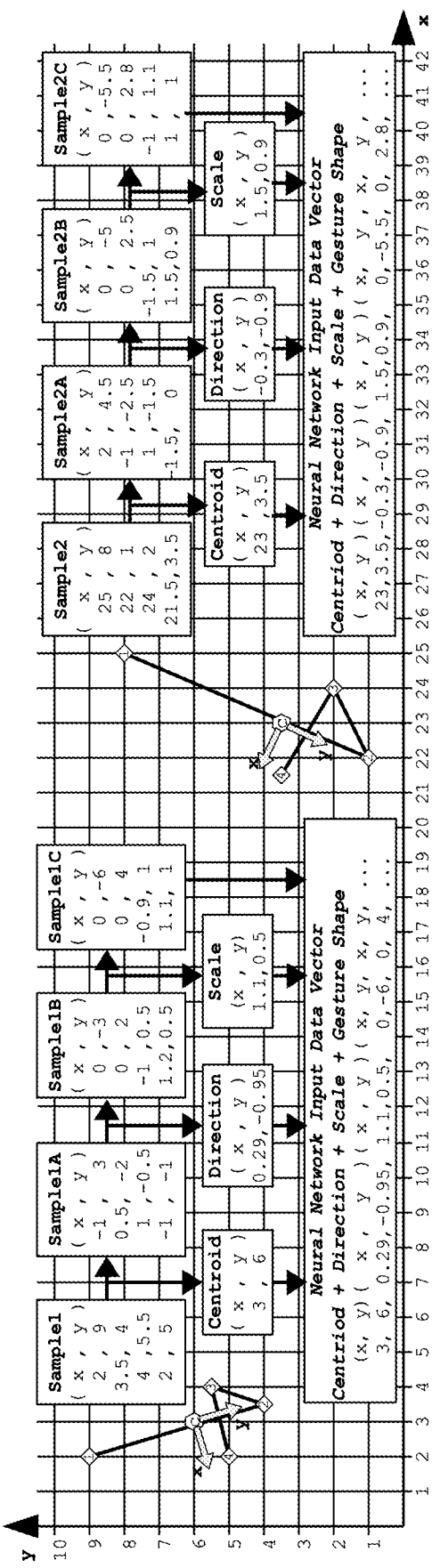

Finally, as shown in FIG. 6E, the data of the gesture shape representation ("Sample 1C" and "Sample 2C" respectively) are combined with the previously extracted position (center of gravity), direction, and scale into a new vector "Sample 1D" and "Sample 2D". In the illustrated example, the data vectors "Sample 1D" and "Sample 2D" are constructed by concatenating the data in the shown sequence. However, the present invention allows for various forms of combining the data.

In the illustrated example, the vector "Sample 1D" is [3, 6, 0.29, −0.95, 1.1, 0.5, 0, −6, 0, 4, −0.9, 1, 1.1, 1] and the vector "Sample 2D" is [23, 3.5, −0.3, −0.9, 1.5, 0.9, 0, −5.5, 0, 2.8, −1, 1.1, 1, 1]. From the last eight values of these vectors, it is fairly simple to determine that the two gesture paths "Sample 1" and "Sample 2" are of the same shape. This is useful if both gesture paths are intended by the user to have the same meaning (for example: "move object in this direction"). However, depending on the setting, the computer system can be trained to distinguish the gesture paths as two different gestures based on the first six values. For example, it is possible that the user intended Sample 1 to mean "put object into left recycle bin" and Sample 2 to mean "put object into right recycle bin". In this case, the third value in each vector becomes the distinguishing factor. If this factor negative, then the gesture is pointing to the left, and if the factor is positive then the gesture was performed pointing to the right. A neural network can learn these numerical differences efficiently by assigning greater weight values to factors that are related to the different gesture categories and assigning weight values of zero to those factors that are unrelated. For example, the user may intend a "gesture executed from left to right" to have a different meaning from a "gesture that is executed from right to left", or a "gesture executed at a small scale" to have a different meaning from a "gesture executed at a large scale".

FIG. 7 explicitly illustrates the process as it relates to one embodiment of the path recognition device 110 according to the present invention. The user can move an input device 701 in space. A recording device 702 such as a video camera or a motion detector can detect the position and movement of the input device 701 in space. A tracking device 703 calculates the tracking data 704 as a numeric representation of the position and movement of the input device 701, which can also include additional context data 203. The tracking data 704 which the tracking device 703 outputs contains the motion data and possible additional context data 203, which may be information regarding buttons pressed by the user or information about the system. Then, these data are processed by the previously described method. As an example, by operating the input device 109 the user can provide the operation mode selection data 710 (which selects the operation mode to be either learning mode or recognition mode) to the path recognition device 110. Based on the operation mode selection data 710, the path recognition device 110 executes the operations of the learning mode or recognition mode respectively. When the learning mode is selected, the correct gesture category is provided as training data 217 to the neural network, for example by the user via an input device 109. When the recognition mode is selected, the path recognition device 110 transmits output data obtained via the process 216 to the operation target device 120 (see FIG. 1L). The output data, as it represents the recognized category of the gesture intended by the user, can be used to trigger a particular event in the operation target device 120 (process 705). In some embodiments, the operation mode selection data 710 is entered once when changing the operation mode, which is maintained until the next input of the operation mode selection data 710 changes it. Similarly, the identifier 217 of the training data may be input once when changing the identifier 217 for consecutive gesture sample recordings. Furthermore, in some embodiments the operation mode selection data 710 and identifier 217 may be input separately from input device 109 via the input device 701.

Figure 8:
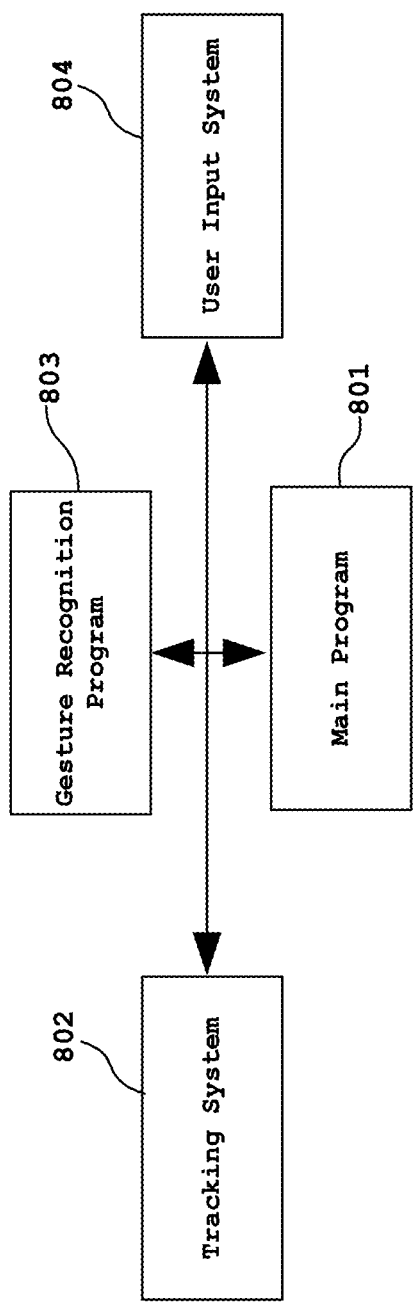
FIG. 8 is a block diagram illustrating the configuration a system where the gesture recognition is implemented as a computer program.

FIG. 8 is a block diagram illustrating the overall system illustrated in FIG. 1K as an implementation in the form of a computer program. FIG. 8 is also an illustration of an embodiment of the present invention in the form of a computer program or computer program part. The main program 801 is a computer program implementation of the operation target device 120 (see FIG. 1L) which can, for example, be a drawing program receiving the user's commands. The tracking system program 802 or tracking system library is a computer program implementation of the tracking system 103, which detects the motion of the user. The path recognition program 803 is an embodiment of the present invention in the form of a computer program which recognizes the gestures made by the user. The user interaction system 804 is a computer program implementation of an interface for the input device 109 or interface 104 (see FIG. 1K).

The above description relates to recognizing gestures defined by a spatial gesture path stemming from the motion of a VR controller (input device 101). However, the present invention is not limited to the processing of motion data consisting of a single continuous movement (gesture stroke) performed with an input device 101. The processing according to the present invention can be applied to any data that can be represented as a path or series of paths in space. The following is a non-exhaustive list of possible alternative applications.

Handling of multi-part gestures. As already illustrated in FIG. 5D, it is possible to use a path recognition device 110 according to the present invention to recognize gestures consisting of a plurality of gesture motions or shape contours (multi-stroke gesture or multi-path gestures). For example, a user can draw a line (gesture path) in space, temporarily interrupt the gesture (for example by releasing a button on the input device 101), and thereafter draw a second line (for example by pressing a button on the input device 101 again) that is parallel to the first line but not connected to it. In the example illustrated in FIG. 5D, for each of the plurality of gesture paths, the position, direction, and size are extracted and an invariant path shape representation is calculated based on the extracted attributes. Thereby, the recognition of multi-stroke (multi-path) gestures can be performed easily and accurately. In contrast, it is possible to extract the attributes of only one part (path) of the gesture. Furthermore, it is possible to only extract one of the attributes of position, direction, and size, for example only the spatial position. In these cases, the recognition of a multi-path gesture can be performed correspondingly on the calculated data.

Figure 9:
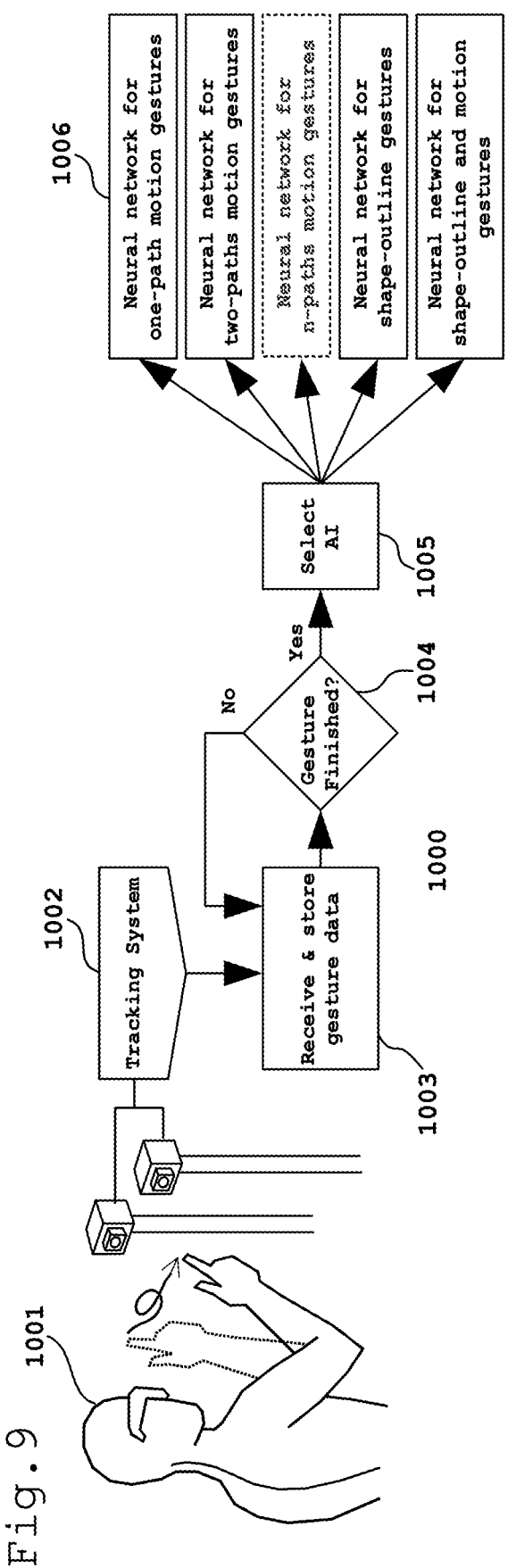
FIG. 9 is a flow diagram illustrating the data processing flow of another embodiment of the present invention.

FIG. 9 illustrates the process of identifying a gesture consisting of a plurality of gesture motions (strokes) using one embodiment of a gesture path recognition device according to the present invention. The user 1001 performs gesture motions, which are tracked by the tracking system 1002. The tracking system 1002 provides motion data to the path recognition device 1000. The path recognition device 1000 receives the motion data and stores a plurality of gesture paths in process 1003. The process 1003 can perform preprocessing operations such as simplification of the gesture path or extracting metadata from the gesture path. Separate gesture motions (strokes) can be recognized, for example by the release of a button on the input device 101 which can be input as context information 203 (see FIG. 2A). The path recognition device 1000 can determine whether the gesture paths received in the past form a complete gesture in process 1004. This can be determined in several ways. One method is to measure the time elapsed since the last gesture motion is performed. If a new gesture motion is not performed within a predetermined time, the gesture is considered complete. Another method is to manually indicate that the gesture is complete, for example via manual input by the user 1001. Regardless of which method is used to determine whether the gesture is complete, as long as the gesture is not considered complete the processing flow of the path recognition device 1000 returns to process 1003 to receive additional gesture data. When the gesture is considered complete, then the path recognition device 1000 will proceed to the next step.

Then, in process 1005, the path recognition device 1000 will select an artificial intelligence from among a plurality of artificial intelligences 1006, which corresponds to the number of gesture motions (strokes) in the complete gesture. In this way, the path recognition device can use an appropriate neural network for multi-part gestures as illustrated in FIG. 5D. Thus, it can be avoided to misidentify gestures consisting of a different number of gesture motions. Further, as illustrated in FIG. 9, the gesture can consist not only of a varying number of gesture motions (strokes) but of any combination of gesture motions (strokes) and shape contours (outlines) for which a corresponding neural network can be selected. FIG. 9 shows, as a possible, non-exhaustive list of artificial intelligences 1006, a neural network for gestures consisting of one gesture motion, a neural network for gestures consisting of two gesture motions, a neural network for gestures consisting of n gesture motions, a neural network for gestures consisting of shape outline paths, and a neural network for gestures consisting of shape outlines and gesture motions. These are just 5 examples for possible artificial intelligences. The number of gesture motions can be acquired by the path recognition device 1000 for example as context information (see FIG. 5D) from the tracking system 1002. The received data can include context information regarding whether the data represents a gesture motion or a shape outline. The tracking system 1002 can for example generate context information based on the users input via an input device 101 (see FIG. 1K) and provide that context information to the path recognition device 1000.

Handling gestures performed with a body part. Instead of using an input device, the motion of various parts of a human or animal body can be used as input data. For example, drawing an invisible line with an index finger in the air or the movement of a dog's tail can also be used as a form of gesture motion.

Handling human or vehicle motion paths. Large-scale movement of a human or vehicle can also be processed by the path recognition device 110, 1000. Thus, the present invention can also be used to identify general patterns of movement. For example, it may be possible to identify different types of aircraft maneuvers.

Handling shape contour paths. Instead of using the motion over time as the basis for gesture data, spatial paths along the visual contour of an object (here the target object to be recognized) can also be used as possible input data for the path recognition device 110, 1000. In this way, the path recognition device 110, 1000 can be used to identify static hand signs or solid objects.

Handling input data combining several types of data. As already described with regard to multi-part gestures, it is possible not only to combine several paths of the same type, but also combinations of different types of input data which have not yet been mentioned as long as they can be expressed as spatial paths. For example, the path recognition device 110, 1000 can recognize gestures using both the particular shape of a hand and its motion. "Shaking the index finger", "pointing with the index finger", "shaking the thumb", and "pointing with the thumb" can thus be recognized as different gestures. For example, the tracking system 103 (FIG. 1L and FIG. 9) can detect both the shape contour and the motion of a hand to generate path data. These two path data sets can then be input into the path recognition device 110, 1000 as two separate paths. As explained in the previous example of multi-stroke gestures, the path recognition device 110, 1000 may receive data from manually identifying the type of data or may attempt to automatically identify the type of data. Thus, while avoiding erroneous misidentification of the different types of data, it is possible to select a neural network suitable for the respective type of input data. This embodiment also relates to the artificial intelligence selection process in FIG. 9.

The present application is based on Japanese Patent Application No. 2019-59644, filed by the present applicant in Japan on Mar. 27, 2019, the entire contents of which are incorporated herein by reference.

The previous descriptions of specific embodiments of the present invention have been presented for the purpose of illustration. They are not exhaustive and are not intended to limit the invention to the specific details of the presented embodiments. Numerous possible modifications and variations will be obvious in the light of the descriptions above.

DESCRIPTION OF SYMBOLS

100 computer system, 101 input device, 102 recording apparatus, 103 tracking system, 104 input-output interface unit, 105 processor, 106 display device, 107 memory, 108 storage medium, 109 input device, 110 path recognizing device, 120 operation target device, 130 network, 131 server, 202 tracking data (path data) 203 context metadata (additional information), 205 data points (positional data of a set of points), 207 data set (attribute invariant position data), 208 metadata (attributes), 210 data vector (input data), 213 category values (estimates of probability), 217 category identifier (training data), 401 point groups (positional data), 403, 405, 407 point group data (attribute-invariant positional data), 408 input data vector, 411, 412, 413 attributes, 502, 522,529 numeric data (input data), 508 context information (additional data, input data), 510 gesture category (training data), 526 recognition result data, 704 tracking data (path data), 710 operation mode selection data, 801 main program, 802 tracking system, 803 gesture recognition program (path recognition program), 804 user interaction system, 1000 path recognition device, 1001 user, 1002 tracking system, 1006 neural network (artificial intelligence).

What is claimed is:

1. A path recognition method for identifying path sets including of one or more paths in 2-dimensional or 3-dimensional space by using an artificial intelligence, the method comprising:

accepting input data including path set data representing the path sets;

based on the accepted input data path set data, extracting at least one attribute of position, direction, and scale from each of one or more point groups including positional data of points along at least some part of one or more paths of the path sets;

calculating one or more point groups including positional data which is invariant to and not dependent on the at least one attribute by transforming the positional data of the point group of-points along at least part of a path of the one or more paths of the path sets with the corresponding at least one attribute;

entering data including the positional data of the point group derived from the point group along the paths constituting a path set into the artificial intelligence as input data;

receiving as output data of the artificial intelligence an estimate of the probability of the path set belonging to each of a plurality of predefined categories, the estimates being calculated by the artificial intelligence;

the input data entered into the artificial intelligence including the attribute invariant point group data of positional data of points along at least a part of one or more paths of the path set; and the input data entered into the artificial intelligence further including at least one of the attributes of the at least some part of the one or more paths of the path sets.

2. The path recognition method of claim 1, wherein operation mode selection data is accepted to select either a training mode or a recognition mode as mode of operation, where when training mode is selected as an operation mode the correct output data desired from the artificial intelligence is provided as an input which is accepted as training data and by providing this training data to the artificial intelligence used to train the artificial intelligence, and when recognition mode is selected as operation mode the output data includes, as recognition result data, a category indicated by the artificial intelligence output data to have a highest probability estimate among a plurality of categories.

3. The path recognition of claim 2, wherein the result data set includes at least part of the attributes which have been extracted from the at least some part of the one or more paths of the path set.

4. The path recognition method according to claim 1, wherein an average position of a whole point group of the at least part of the one or more paths of the path set is among extracted attributes as the position of the point group.

5. The path recognition method according to claim 1, wherein a standard deviation or set of standard deviations of the whole point group of the at least part of the one or more paths of the path set is among extracted attributes as a scale of the point group.

6. The path recognition method according to claim 1, wherein a main axis according to a principal component analysis of the whole point group of the at least part of the one or more paths of the path set is among the extracted attributes as the direction of the point group.

7. The path recognition method according to claim 1, wherein the attributes extracted from the whole point group of the at least part of the one or more paths of the path set are the position, size, and direction.

8. The path recognition method according to claim 1, wherein the at least part of the one or more paths of the path set is all of the one or more paths.

9. The path recognition method according to claim 1, wherein the input data for the artificial intelligence includes at least one of the extracted attributes of each of the at least part of the one or more paths of the path set.

10. The path recognition method according to claim 1, wherein a point group including a predetermined number of points is selected along each path of the set of paths, the point group being selected to represent each respective path by a set of consecutive line segments between the point group's points to minimize the spatial difference between the respective path and a representing point group's line segments.

11. The path recognition method according to claim 10, wherein the selection of a point group including of a predetermined number of points for each path is done by simulated annealing.

12. The path recognition method according to claim 1, wherein the artificial intelligence is a neural network.

13. The path recognition method according to claim 1, wherein the accepted input data which includes the path set data also includes additional data, and the additional data is included in the input data for the artificial intelligence.

14. The path recognition method according to claim 1, wherein each path of the path set accepted as input data represents either a contour path along an outline of a gesture or a motion path along a gesture motion.

15. The path recognition method according to claim 1, wherein the estimates of probability calculated by the artificial intelligence are obtained by repeatedly providing data as input data and selecting an artificial intelligence according to a type of the one or more paths of the path set accepted as input data and using that data as input.

16. The path recognition method according to claim 15, wherein the type of the one or more paths of the path set includes the number of paths constituting the path set.

17. A path recognition device comprising a computer which is capable of executing the path recognition method according to claim 1.

18. A computer-readable path recognition program which is capable of executing the path recognition method according to claim 1.

19. A computer-readable intransient storage medium which stores a program which is capable of executing the path recognition method according to claim 1.

* * * * *